US010958923B2

(12) United States Patent
Zhang et al.

(10) Patent No.: US 10,958,923 B2
(45) Date of Patent: Mar. 23, 2021

(54) PARALLEL VIDEO ENCODING

(71) Applicant: SZ DJI TECHNOLOGY CO., LTD., Shenzhen (CN)

(72) Inventors: Jianhua Zhang, Shenzhen (CN); Hao Wang, Shenzhen (CN); Yue Dong, Shenzhen (CN); Bin Han, Shenzhen (CN); Wenjun Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/261,331

(22) Filed: Jan. 29, 2019

(65) Prior Publication Data

US 2019/0158859 A1 May 23, 2019

Related U.S. Application Data

(63) Continuation of application No. PCT/CN2016/093279, filed on Aug. 4, 2016.

(51) Int. Cl.
*H04N 19/436* (2014.01)
*H04N 19/15* (2014.01)
(Continued)

(52) U.S. Cl.
CPC ......... *H04N 19/436* (2014.11); *H04N 19/127* (2014.11); *H04N 19/15* (2014.11);
(Continued)

(58) Field of Classification Search
CPC .. H04N 19/124; H04N 19/127; H04N 19/146; H04N 19/174; H04N 19/423;
(Continued)

(56) References Cited

U.S. PATENT DOCUMENTS

2006/0114985 A1 6/2006 Linzer
2006/0209952 A1* 9/2006 Tanizawa ............ H04N 19/176
375/240.03

(Continued)

FOREIGN PATENT DOCUMENTS

CN 1980392 A 6/2007
CN 101150719 A 3/2008

(Continued)

OTHER PUBLICATIONS

The World Interllectual Property Organization (WIPO), The International Search Report and Written Opinion for PCT/CN2016/093279, May 2, 2017, 7 pages.

(Continued)

*Primary Examiner* — Anner N Holder
(74) *Attorney, Agent, or Firm* — Anova Law Group, PLLC

(57) ABSTRACT

An electronic device includes a slice splitter and a slice encoder. The slide splitter is configured to split video data into a plurality of slices. Each slice contains a plurality of data blocks and each data block contains a plurality of data points. The slice encoder includes one or more video encoding circuits and is configured to encode the data blocks in a plurality of data streams concurrently to obtain encoded data streams and combine the encoded data streams into a combined data stream.

16 Claims, 13 Drawing Sheets

FIG. 7

(51) Int. Cl.

| | |
|---|---|
| ***H04N 19/70*** | (2014.01) |
| ***H04N 19/124*** | (2014.01) |
| ***H04N 19/127*** | (2014.01) |
| ***H04N 19/146*** | (2014.01) |
| ***H04N 19/174*** | (2014.01) |
| ***H04N 19/423*** | (2014.01) |
| ***H04N 19/625*** | (2014.01) |

(52) U.S. Cl.
CPC ......... *H04N 19/174* (2014.11); *H04N 19/423* (2014.11); *H04N 19/70* (2014.11); *H04N 19/124* (2014.11); *H04N 19/146* (2014.11); *H04N 19/625* (2014.11)

(58) Field of Classification Search
CPC .... H04N 19/436; H04N 19/625; H04N 19/70; H04N 19/15
See application file for complete search history.

(56) References Cited

U.S. PATENT DOCUMENTS

2008/0253448 A1* 10/2008 Lin ...................... H04N 19/436 375/240.03
2010/0074337 A1* 3/2010 Gao ..................... H04N 19/176 375/240.16
2010/0195741 A1 8/2010 Chou et al.
2014/0362922 A1* 12/2014 Puri ..................... H04N 19/119 375/240.16
2015/0067421 A1* 3/2015 Baptist ................ H04L 67/1097 714/723
2016/0301945 A1* 10/2016 Saito .................... H04N 19/436
2016/0309149 A1* 10/2016 Thirumalai .......... H04N 19/129
2017/0031862 A1* 2/2017 Yu ....................... G06F 13/4286
2017/0192430 A1* 7/2017 Yang .................... G05D 1/0088

FOREIGN PATENT DOCUMENTS

CN 101686388 A 3/2010
GB 2528246 A 1/2016

OTHER PUBLICATIONS

Chi Ching Chi et al., Parallel Scalability and Efficiency of HEVC Parallelization Approaches, IEEE Transactions on Circuits and Systems for Video Technology, Institute of Electrical and Electronics Engineers,USA, vol. 22, No. 12, Dec. 2012 (Dec. 1, 2012), pp. 1827-1838.

* cited by examiner

Encoding Operating parameters 320

| Operating Clock (Frequency) 322 | 400 MHz |
|---|---|
| Frequency Transformer Concurrency 324 | 8 data points every two clock cycles |
| Quantizer Concurrency 326 | 4 data points every clock cycle |
| Slice Encoder Concurrency 328 | 4 data points every clock cycle |

| Slice Header Information Parameters 802 | Values 804 |
|---|---|
| Slice Header Size in Bytes 810 | 2 |
| Scale factor 812 | 4 |
| Size of Luma data in the slice in Bytes 814 | 186 |
| Size of Chroma data in the slice in Bytes 816 | 62 |
| ⋮ | ⋮ |

FIG. 8

| Slice Index 902 | Slice Length (e.g., Indicated in 2 Bytes) 904 |
|---|---|
| Slice 1 912 | 486 |
| Slice 2 914 | 359 |
| Slice 3 916 | 378 |
| Slice 4 918 | 186 |
| ⋮ | ⋮ |

FIG. 9

PARALLEL VIDEO ENCODING

CROSS-REFERENCE TO RELATED APPLICATION

This application is a continuation of International Application No. PCT/CN2016/093279, filed on Aug. 4, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The disclosed embodiments relate generally to data process, including but not exclusively, to video encoding.

BACKGROUND

Multimedia communication is a cornerstone of modern day commerce. In multimedia communication, video streams are transmitted from a source location to a destination through a communication network. A raw video stream often contains 15 to 60 frames per second, and each frame includes hundreds of thousands or millions of pixels (also called pels, dots, or picture elements). Thus, storing and transmission the raw video stream would take large amount of storage space and transmission bandwidth.

To enhance transmission efficiency, video encoding is often used to compress video streams. At the source location, a video stream may be encoded to remove data redundancy, where the encoded data may be decoded without any loss of information at the destination (the techniques are often referred to lossless compression/encoding). Additionally or in alternative, at the source location, the video stream may be encoded to remove data that loss of which has little impact to someone perceiving the decoded video stream at the destination location (the techniques are often referred to lossy compression/encoding).

While video encoding can be done in software, for multimedia communication that has time delay requirements, video encoding is often done in hardware. Traditionally, video encoding is done by stationary hardware such as encoding server/computer. The stationary hardware can provide high quality compression in various protocols. However, stationary hardware is often bulky and power hungry, thus not suitable for a mobile environment and that is the general area that embodiments of the disclosure are intended to address.

SUMMARY

Described herein are systems, methods, storage media, and computer programs that support encoding of video data. In one embodiment, an electronic device is disclosed. The electronic device comprises a slice splitter and a slice encoder implemented using one or more video encoding circuit. The slice splitter is configured to split video data into a plurality of slices, where each slice contains a plurality of data blocks, each data block containing a plurality of data points, which are processed in a plurality of data streams. The slice encoder, implemented using one or more video encoding circuits, is configured to encode the data blocks in the plurality of data streams concurrently and combine the encoded data into a combined data stream.

The embodiments of the present disclosure provide video encoding circuits that encode video data within a slice concurrently using a plurality of data streams, the concurrency of intra-slice encoding allows the video data to be encoded in real-time for multimedia communications.

BRIEF DESCRIPTION OF DRAWINGS

FIG. 8 illustrates composition of slice header information according to one embodiment of the disclosure.

FIG. 9 illustrates a slice index table according to one embodiment of the disclosure.

DETAILED DESCRIPTION

Figure 1:
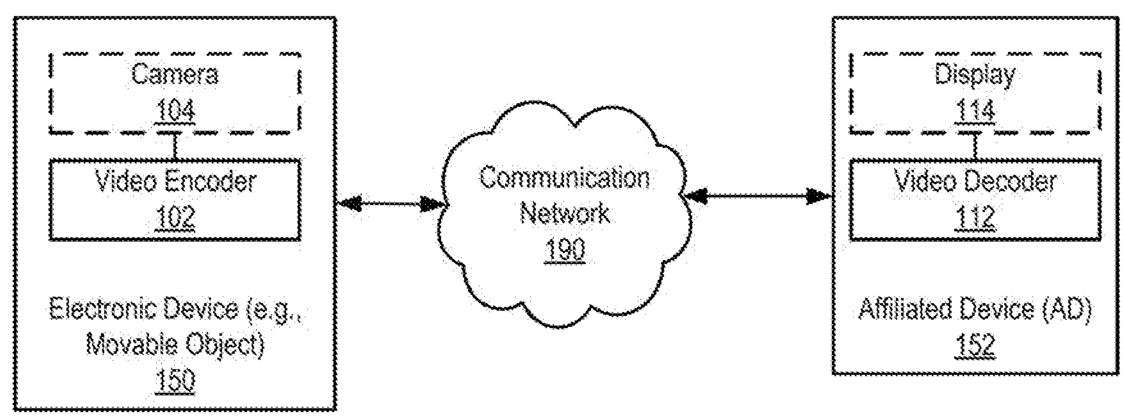
FIG. 1 is an exemplary illustration of a video communication environment, in accordance with various embodiments of the present disclosure.

The disclosure is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

In figures, Bracketed text and blocks with dashed borders (e.g., large dashes, small dashes, dot-dash, and dots) may be used herein to illustrate optional operations that add additional features to embodiments of the disclosure. However, such notation should not be taken to mean that these are the only options or optional operations, and/or that blocks with solid borders are not optional in certain embodiments of the disclosure. Also in figures, reference numbers are used to refer to various element or components, the same reference numbers in different figures indicate the elements or components having the same or similar functionalities.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as computer or machine-readable storage media (e.g., magnetic disks, optical disks, read only memory (ROM), flash memory devices, phase change memory) and computer or machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more microprocessors coupled to one or more machine-readable storage media to store code for execution on the set of microprocessors and/or to store data. For instance, an electronic device may include non-volatile memory containing the code since the non-volatile memory can persist code/data even when the electronic device is turned off (when power is removed), and while the electronic device is turned on that part of the code that is to be executed by the microprocessor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices.

A movable object is an electronic device that includes one or more propulsion units to propel the movement of the movable object. A movable object can be an unmanned aircraft, an unmanned vehicle, or a robot. One commonality of these movable objects is that no human pilot/driver/operator aboard to control these movable objects. That is, the movement of the movable object, using the one or more propulsion units, is controlled through a different electronic device. An unmanned aircraft is also referred to as an unmanned aerial vehicle (UAV), a drone, or an unmanned aircraft system (UAS), all of which are used interchangeably referring to the unmanned aircraft herein.

An affiliated device is an electronic device that affiliates with another electronic device in a video communication environment. In a video communication environment, both the electronic device and the affiliated device may be a wearable electronic device, a handheld electronic device, or a movable object. The referred affiliation between the affiliated device and the electronic device is typically communicatively coupling (through a communication network) or connecting between the affiliated device and the electronic device (through one or more wireline).

FIG. 1 is an exemplary illustration of a video communication environment, in accordance with various embodiments of the present disclosure. As shown in FIG. 1, the video communication environment 100 includes an electronic device 150, a communication network 190, and an affiliated device 152.

The communication network 190 may be a variety of wireline or wireless networks. The wireline between the electronic device 150 and the affiliated device 152 includes one or more physical communication links such as copper lines and optical fibers. The wireline network may deploy technologies such as the universal asynchronous receiver/transmitter (UART) technology, the controller area network (CAN) technology, and the inter-integrated circuit (I2C) technology the wireless communication network may deploy technologies such as wireless local area network (WLAN) (e.g., WiFi™), Bluetooth, cellular the third/fourth/fifth generation (3G/4G/5G).

The electronic device 150 includes a video encoder 102. A camera 104 may be implemented within or coupled to the electronic device 150. The camera 104 captures images and video, and the captured images and/or video are encoded by the video encoder 102. When a camera captures video, the camera is sometimes referred to as camcorder or video recorder, and in this specification, these terms are used interchangeably. While only one camera is illustrated, it is to be understood that the electronic device 150 may work with multiple cameras, the captured images and/or video from which are encoded according to one or more scheduling policy based on an operator request (e.g., the operator of the electronic device 150) and/or workload characteristics (e.g., load balancing based on the workloads for the video encoder 102). In other words, the video encoder 102 may receive multiple images and/or video feeds, and encode them so that they can be transmitted in more compact forms.

It is to be noted that encoding technologies for encoding video may be viewed as a superset that encompasses the encoding technologies for encoding images, as video being displayed is a stream of video frames, each being an image. Thus unless noted otherwise, the operations discussed in this specification that are performed on video data apply to still image data too. Additionally, a camera may capture audio data, positional data along with the pictorial data, thus herein below the video data in this specification may include data of video frames, audio data, positional data, and other information captured by one or more cameras.

The encoded data is then from the electronic device transmitted to the affiliated device 152 through the communication network 190. The affiliated device 152 is another electronic device. At the affiliated device 152, the encoded data is decoded by a video decoder 112. The decoded data can then be viewed, e.g., on a display 114, which may be within the affiliated device 152 or coupled to the affiliated device 152. When the encoded data includes audio data, the decoded data can be listened to from a speaker (not shown), singly or along with the display. The video encoder 102 and video decoder 112 together are often referred to as a codec system.

A codec system may support one or more video compression protocols. For example, the codec in the video communication environment 100 may support one or more of H.265 high efficiency video coding (HEVC), H.264 advanced video coding (AVC), H.263, H.262, Apple ProRes, Windows Media Video (WMV), Microsoft (MS) Moving Picture Experts Group (MPEG)-4v3, VP6-VP9, Sorenson, RealVideo, Cinepak, and Indeo. While each video compression protocol has its own advantages and drawbacks, the power consumption, coding/decoding speed, and/or picture fidelity are often the most important factors to consider. Embodiments of the disclosure are not limited to a particular video compression protocol and are applicable to video compression protocols that support slice encoding.

In one embodiment, the electronic device 150 is a mobile electronic device. For example, the electronic device 150 may be a wearable electronic device, a handheld electronic device, or a movable object. When the electronic device 150 is a movable object, the camera 104 may be an onboard camera, which takes aerial photographs and video for various purposes such as industrial/agricultural inspection, live event broadcasting, scientific research, etc.

A mobile electronic device generally has a smaller footprint in comparing to a stationary electronic device such as desktop computer/server, thus it is more challenging for a mobile electronic device to encode a large amount of video data in real-time. Yet viewer's expectation of video quality keeps going up. For example, nowadays it is advantageous in the market place to provide 4K resolution video stream to a viewer. To provide the 4K resolution, which refers to a display of horizontal resolution on the order of 4,000 pixels and vertical resolution on the order of 2000 pixels, the camera 104 may be a 4K camera to capture the 4K resolution video. The 4K resolution for a video frame typically includes 7~11 M pixels, and each pixel may include 24 bits, and the resulting video stream cannot be easily encoded in a mobile electronic device, given its relatively small footprint allowed for video encoding hardware.

Embodiments of the present disclosure provide solutions to address these issues.

Figure 2:
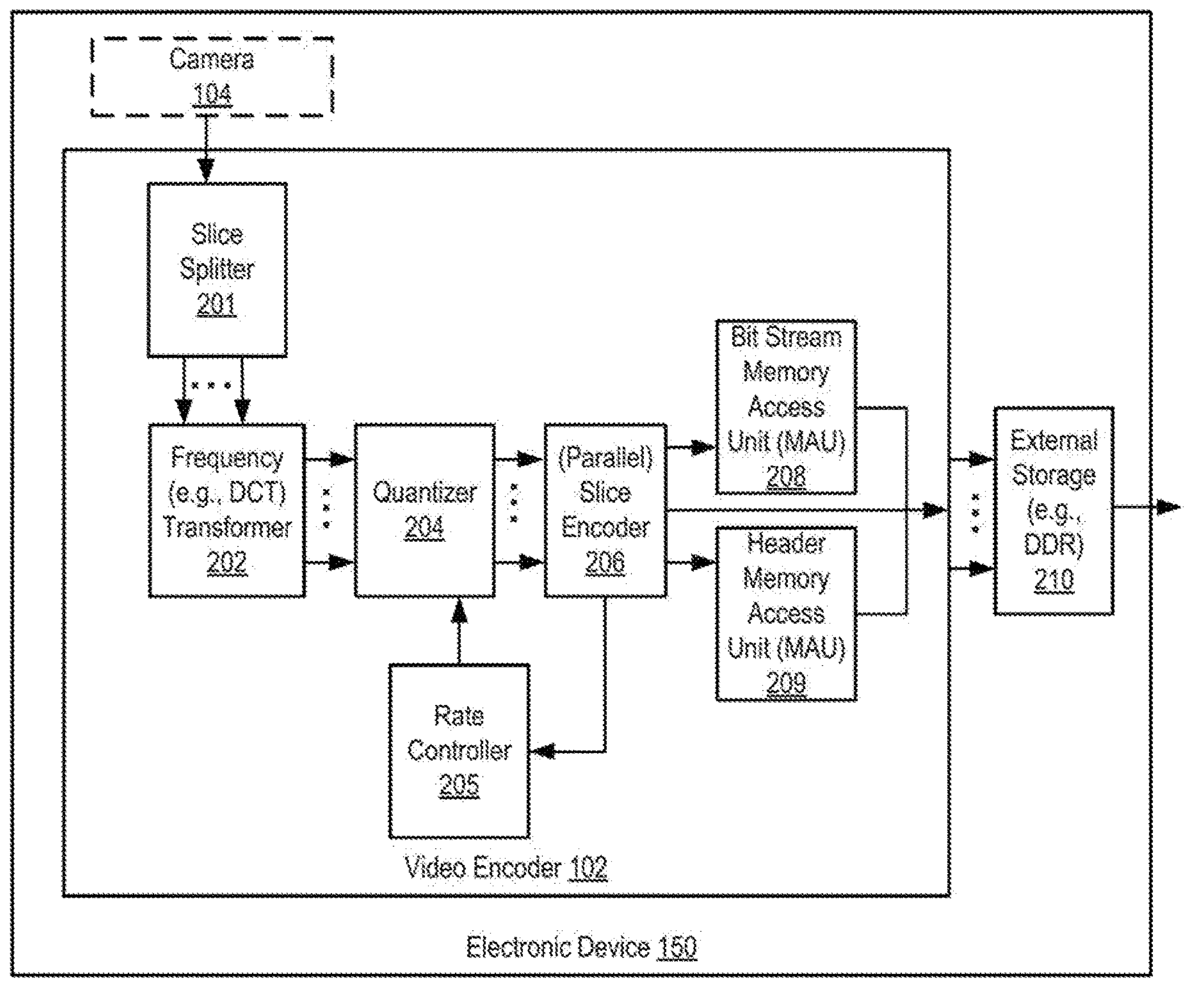
FIG. 2 is an exemplary electronic device including a video encoder according to one embodiment of the disclosure.

Embodiments of the present disclosure utilize intra-slice parallel encoding through one or more video encoding circuits. FIG. 2 is an exemplary electronic device including a video encoder according to one embodiment of the disclosure. The electronic device 150 includes a video encoder 102 and an external storage 210, and optionally camera 104.

The camera 104 may be a 4K camera, which provides video data in 4K resolution, often referred to as 4K ultra-high-definition (UHD), which has a resolution such as 4096×2160 and 3840×2160 pixels. While 4K resolution is used as an example of high definition (HD) resolution of a video stream, embodiments of the disclosure are not limited to encoding of video streams in 4K resolution, and embodiments of the disclosure may encode video data in other resolutions such as standard definition (SD) (e.g., 480 lines interlaced, 576 line interlaced), full high definition (FHD) (e.g., 1920×1080 pixels), 5K UHD (e.g., 5120×2880, 5120×3840, 5120×2700 pixels), and 8K UHD (e.g., 7680×4320, 8192×5120, 10240×4320 pixels). In other words, embodiments of the disclosure are not resolution specific, and they may be implemented to encode large amount of video data in real-time or near real-time.

The video encoder 102 includes a slice splitter 201, a frequency transformer 202, a quantizer 204, a slice encoder 206, a rate controller 205, a bit stream memory access unit (BSMAU) 208 (bit stream memory access circuit), and a header memory access unit (HMAU) 209 (header memory access circuit). In one embodiment, the video encoder 102 is implemented as a semiconductor intellectual property (IP) block (also referred to as an IP core) that is a reusable unit of logic, cell, or chip including integrated circuits (referred to simply as circuits hereinafter) in a die. An IP block is the intellectual property of one party, and that party may or may not be the same party that provides the electronic device 150. It is to be noted that only entities most relevant to the embodiments of the disclosure are illustrated, and the video encoder 102 may include other modules/circuits. For example, a video encoder often includes hardware such as image signal processor (ISP), microprocessors/cores, registers/caches/memory, and software modules such as video process drivers to assist the circuits to process the video streams.

While only one video encoder is illustrated, the electronic device 150 may include multiple video encoders that encode video data from the camera 104 or a different camera. The video encoder 102 receives video data from the camera 104, and the encoding process of the video encoder 102 is detailed herein.

Then the encoded data from the video encoder 102 is stored at an external storage 210, which is outside of the video encoder 102 thus referred to as being "external". The external storage may be one or more of a variety of dynamic random-access memory (DRAM) such as double data rate synchronous DRAM (DDR SDRAM or referred to simply as DDR), single data rate (SDR) SDRAM, static RAM (SRAM), persistent mass storage device (e.g., Flash, magnetic disk), and persistent memory such as Phase Change Memory (PCM), Phase Change Memory and Switch (PCMS), Memristor, and spin-transfer torque (STT) RAM.

The embodiments of the present disclosure aim at optimizing video encoding without impacting the video decoding process. Thus, in one embodiment, the embodiments of the present disclosure are implemented at the electronic device 150 while the affiliated device 152 is unchanged. In other words, the affiliated device 152 is unaware of the improvement in the electronic device 150 as the encoded data received at the affiliated device 152 is the same, with or without embodiments of the present disclosure implemented in the electronic device 150.

Hiding the changes of the encoding process from the decoding at the affiliated device 152 is advantageous. The decoding process is often specified in a standard, which defines how encoded data stream is to be decoded. With the embodiments of the present disclosure changes only how the encoding is performed without impacting the decoding process, the video decoder 112 remains the same thus the embodiments of the present disclosure are compatible with existing video decoder and makes the adoption of the embodiments easier.

Figure 3:
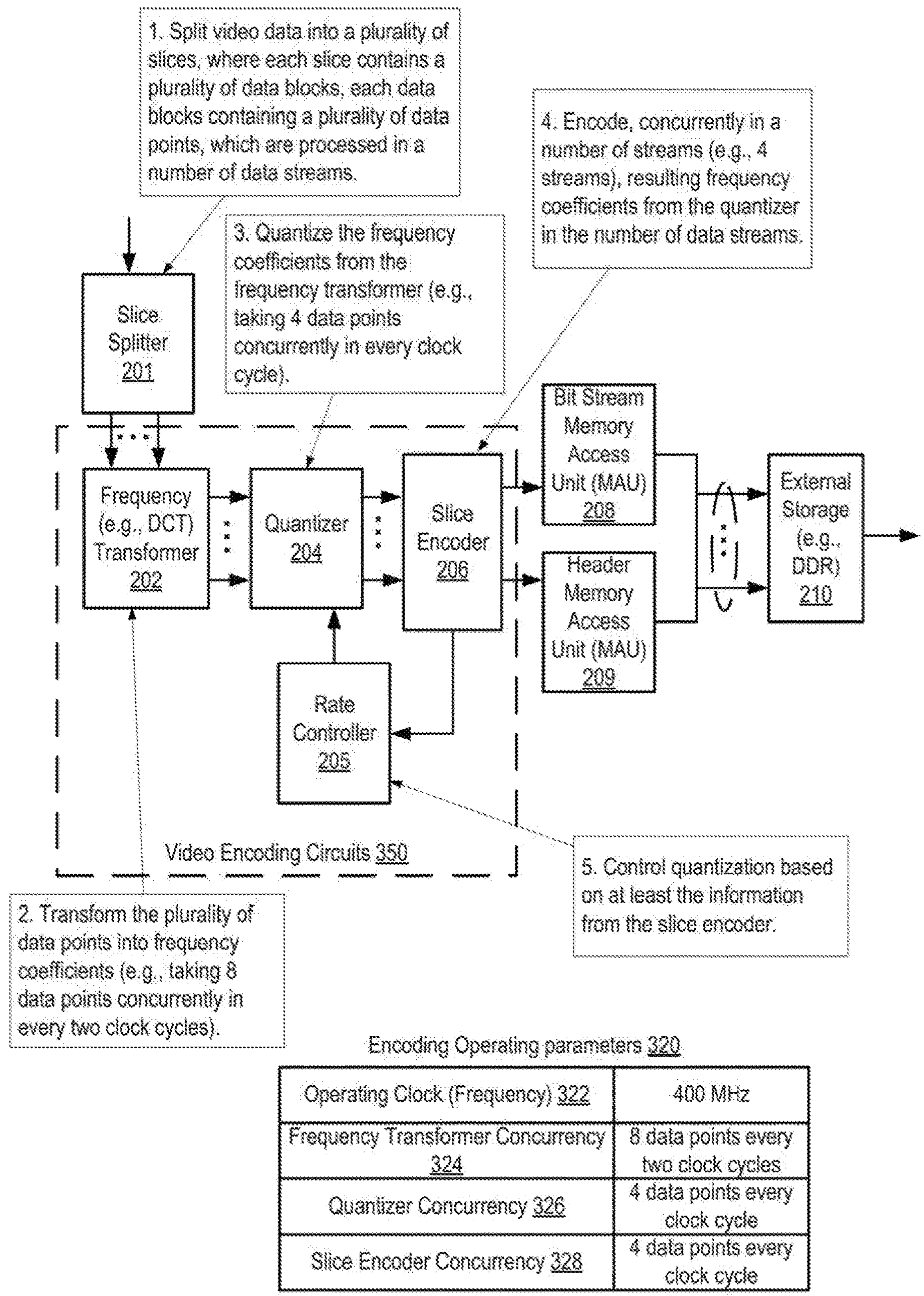
FIG. 3 illustrates video encoding processes according to one embodiment of the disclosure.

FIG. 3 illustrates video encoding processes according to one embodiment of the disclosure. FIG. 3 is similar to FIG. 2, and the same references indicate elements or components having the same or similar functionalities. Certain aspects of FIG. 2 have been omitted from FIG. 3 in order to avoid obscuring other aspects of FIG. 3.

Each of the frequency transformer 202, quantizer 204, slice encoder 206, and rate controller 205 may be implemented in circuits, and together they are referred to as video encoding circuits 350. Note the video encoding circuits 350 may include other circuits and components, and some of the illustrated circuits within the video encoding circuits 350 may be integrated with each other or with other circuits thus are referred to using different terms.

Task box 1-5 illustrate the order in which operations are performed according to one embodiment of the disclosure.

At task box 1, the slice splitter 201 splits video data into a plurality of slices. The video data is received from the camera 104. Each slice contains a plurality of data blocks, each data blocks containing a plurality of data points, which are processed in a number of data streams. The slice splitter 201 may be implemented as a software/firmware module in one embodiment. In an alternative embodiment, the slice splitter 201 may be implemented using one or more circuits.

Figure 4A:
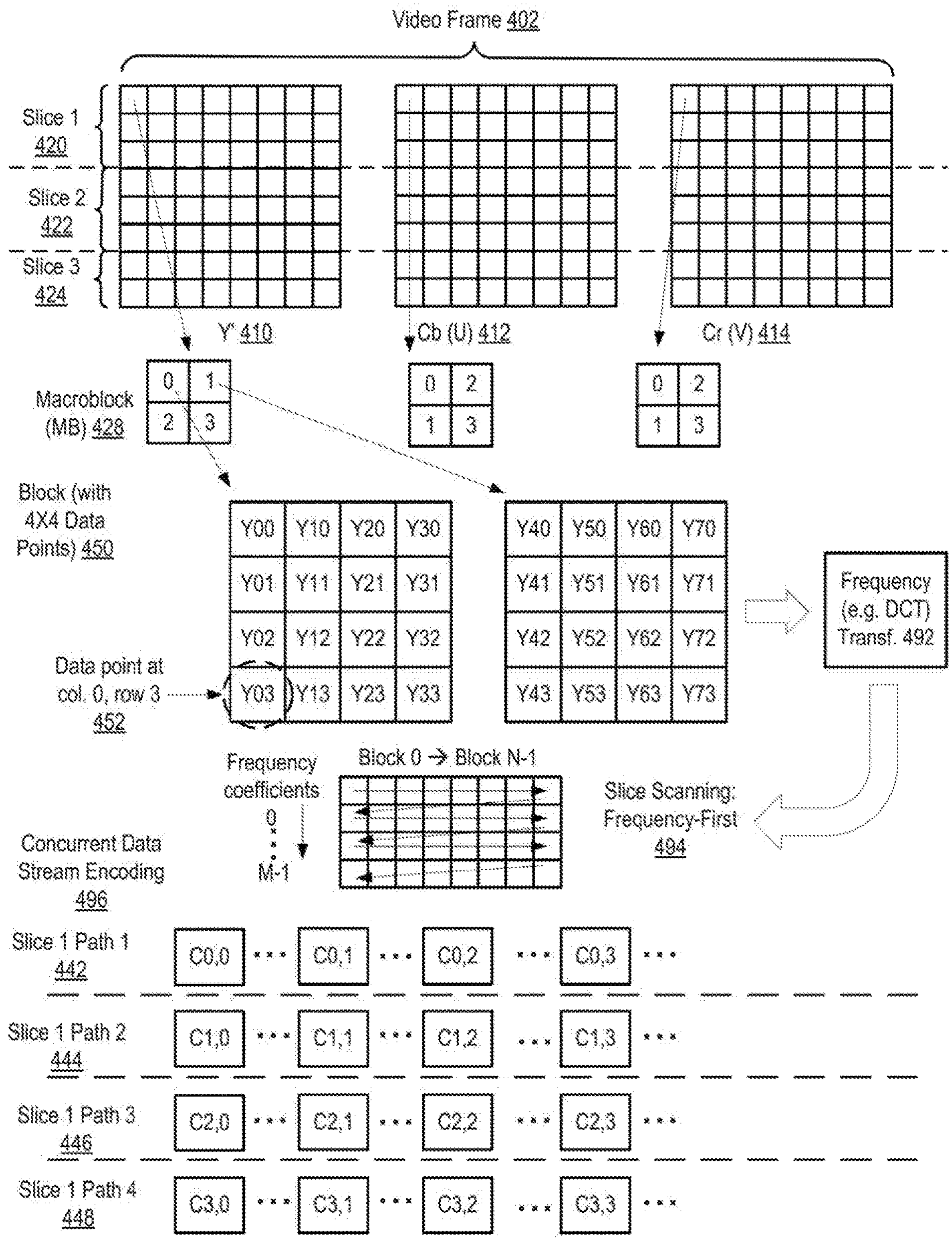
FIG. 4A illustrates data blocks being processed through encoding according to one embodiment of the disclosure.

The slice splitting process may be illustrated in FIG. 4A, which illustrates data blocks being processed through encoding according to one embodiment of the disclosure. Video data includes a sequence of video frames that are received from a camera such as the camera 104 at a certain rate. For example, the video data may be a video stream of 15, 30, 60, or 120 frames per second received from the camera 104.

FIG. 4A illustrates a video frame 402, which includes a luma (Y') channel 410, and two chroma channels of the blue chroma (Cb) and red chroma (Cr) channels 412 and 414. Y' is distinguished from Y, which is luminance that encodes light intensity nonlinearly based on gamma corrected red green blue (RGB) primaries. Y'CbCr color space is defined by a mathematical coordinate transformation from an associated RGB color space.

The scopes of the terms Y'CbCr, YCbCr, Y'UV, YUV, and YPbPr are sometimes ambiguous and overlapping, and the embodiments of the present disclosure are not limited to a particular color space scheme. For example, the illustrated Cb and Cr channels in FIG. 4A may be replaced with U and V channels. The description of the disclosure uses Y'CbCr as an example, and it will be apparent to those skilled in the art that other color spaces may utilize the embodiments of the disclosure.

Within the video frame 402, macroblocks are defined for data processing. Each macroblock includes data blocks from the luma channel and the two chroma channels. The illustrated sampling ratio is 4:4:4, where each channel has the same amount of data blocks in a macroblock. As illustrated, with the sampling ratio of 4:4:4, the macroblock 428 includes 4 data blocks from each of the luma channel and the two chroma channels. The data blocks within different channels may be ordered differently. In this example, the data blocks in the luma channel are ordered horizontally first and then vertically, while the data blocks in the two chroma channels are ordered vertically first and then horizontally.

While the sampling ratio of 4:4:4 is illustrated, other sampling ratios such as 4:2:2, 4:2:0, 4:1:1 are also widely used. With different sampling ratios, different numbers of data blocks from the luma and chroma channels may form a macroblock. For example, a macroblock with a sampling ratio of 4:2:0 may include 4 data blocks from the luma channel and 1 data block each from each chroma channel, while a macroblock with a sampling ratio of 4:2:2 may include 4 data blocks from the luma channel and 2 data blocks each from each chroma channel.

Note that sometimes the sampling ratios are denoted without semicolon between the numbers such as 444, 420, and 411. Additionally, some video codec includes an alpha channel, which is an additional image channel (e.g., extending an RGB image) or standalone channel controlling alpha blending that combining a translucent foreground color with a background color, thereby producing a new blended color). When the alpha channel is included, the sampling ratio may be denoted with four numbers, such as 4:4:4:4 or 4444 for the macroblocks with equal amount of data blocks in each channel.

A data block often includes 8×8=64 data points. Each data point may be a pixel. Each pixel may be represented by 1~48 bits. 24 bits per pixel sometimes is referred to as true color, 30/36/48 bits per pixel sometimes is referred to as deep color, and they are commonly deployed. As illustrated, a data block in FIG. 4A includes 4×4=16 data points, and each data point has a value of Ymn, where m is the row number and n is the column number of the data block within the video frame 402. Thus, Y03 is the luma data value (e.g., represented by one of 1~48 bits) at column 0, row 3 as illustrated at reference 452. The chroma data values may be represented similarly as luma data values, and they are not illustrated in FIG. 4A due to space limitation.

The embodiments of the disclosure are not limited to a particular sampling ratio or a particular form of a data block. While FIG. 4A illustrates the sampling ratio of 4:4:4 and each data block having 4×4=16 data points, the example is for simplicity of illustration, and it will be apparent to those skilled in the art that other sampling ratios and other data block formation may utilize the embodiments of the disclosure.

The video frame 402 is a key frame (also referred to as an intra-frame or I-frame) that contains data points of a complete image. A video stream may also include P-frames (predicted picture frames) that include changes from a previous frame and B-frames (bi-predictive picture frames) that includes change from the previous frame and following frame. Each P-frame and B-frame may be represented by a macroblock and a motion vector. The details of the compression of P-frames and B-frames are known in the art and not repeated here. It is to be noted that embodiments of the disclosure are not limited to a particular types of frames, and a video stream may contain a variety of I-frames, P-frames, B-frames, or predictive frames.

A slice contains one or more contiguous rows of macroblocks. For example, in FIG. 4A, the macroblocks are ordered in rows. A slice starts at the first macroblock in a row and ends at the last macroblocks in the same or another raw. Thus a slice contains an integer number of complete rows. A slice is byte-aligned, and slices may be transmitted concurrently. Slice 420 includes macroblocks of rows 1-3, slice 422 includes macroblocks of rows 4-6, and slice 424 includes macroblocks of rows 7-8. As illustrated, the slices may not have the same amount of macroblocks. Within a macroblock, the blocks in the luma channel and chroma channels may be numbered in a raster scan order or a zig-zag scan order. For example, the data blocks in macroblock 428 luma channel are numbered in a raster scan order, where the data blocks are numbered one data point line at a time, and the data blocks on the second data point line are numbered following the end of the number of the first data point line. In contrast, the data blocks in macroblock 428 chroma channels are numbered in a zig-zag scan order, which starts at the first data block being Block 0, Block 1 being at the column 0, row 1, Block 2 being at the column 1, row 1, and Block 3 being at the column 1, row 1. That is, the blocks are numbered gradually further away from the block 0. The sequence order of the data blocks (illustrated using sequence numbers of the data blocks) is used for scanning as discussed herein below. It is to be noted while 3 slices are illustrated in the figure, a video frame may contain many more slices. For example, a video frame may be divided into 32 slices.

A slice is a portion of a video frame, and encoding a video frame on slice based enables a codec to achieve the right trade-off between error resilience and compression. The data blocks within a slice may be intra-coded (referred to as intra-slice encoding), and the slice may be reconstructed at the decoder regardless of errors in other slices of the video frame. Thus while slice-based encoding generates additional encoding information at the slice level that needs to be decoded, such codec system provides better error resilience.

With slice splitting, inter-slice encoding may be implemented so that multiple slices may be encoded concurrently through video encoding circuits. Embodiments of the disclosure go steps further, and describe how intra-slice encoding may be performed so that a single slice may be encoded concurrently using multiple data streams.

Referring back to FIG. 3, once the video data is split into the plurality of slices, the slices are provided to the frequency transformer 202, where the values of the data blocks in the slices are transformed into frequency coefficients (also referred to as spectral data coefficients) at task box 2. The frequency transformer 202 converts the values of the data blocks, which are spatial domain video information (luma data and chroma data), into frequency domain data, the frequency coefficients. The frequency transformer 202 may apply frequency transformation on a data block with 8×8, 8×4, 4×8, 4×4, or other size of data points.

The frequency transformer 202 may be a discrete cosine transform (DCT) transformer in one embodiment. Through a DCT operation, data points of a data block are transformed to a set of frequency coefficients of equal size. That is, a DCT operation on a 4×4 or 8×8 data block yields frequency coefficients of 4×4 or 8×8 block respectively. For most video frames, the image information lies at low frequencies which appear in the upper-left corner of the DCT-encoded block. The lower-right values of the DCT-encoded block represent higher frequencies, and may be small enough to be ignored with little visible distortion. The top left corner value in the DCT-encoded block is the DC (direct current, i.e., zero-frequency) component and lower and right more entries represent larger vertical and horizontal spatial frequencies.

The DCT operation is a separable transformation in that a matrix for the DCT transformation may be decomposed into two matrices, one that corresponds to a column transformation and another that corresponds to a row transformation. Thus, the DCT operation may be implemented as two one-dimensional (1D) transformations. Thus, a two-dimensional (2D) DCT is just a 1D DCT applied twice, once in the column direction and once in the row direction. In other words, the frequency transformer 202 may perform a first 1D DCT operation in the column direction of the provided data block, and then perform a second 1D DCT operation in the row direction of the 1D-encoded block to produce a 2D-encode block, containing the frequency coefficients. Alternatively, the first 1D DCT operation may be performed in the row direction of the block and the second 1D DCT operation performed in the column direction of the block.

In one embodiment, the frequency transformer 202 performing DCT is implemented in one or more circuits. For an 8×8 data block, the frequency transformer 202 takes 8 data points concurrently in one clock cycle. Since the operation on the data points at each 1D DCT transformation takes one clock cycle, the 2D transformation decomposed into 2 1D DCT transformation takes two clock cycles for the 8 data points. Thus, the DCT operations on the 8×8 data block takes 16 clock cycles. Similarly, for a 4×4 data block, when the frequency transformer 202 takes 4 data points concurrently in one clock cycle, the DCT operation on the 4×4 takes 8 clock cycles.

In one embodiment, the frequency coefficients produced from the frequency transformer 202 are scanned first, and then the scanned frequency coefficients are quantized by the quantizer 204. In an alternative embodiment, the frequency coefficients produced from the frequency transformer 202 are quantized first, and then scanned. Either sequence may be implemented in embodiments of the disclosure.

In one embodiment, the scan is performed for all the frequency coefficients of a slice. The scan may be performed in a frequency-first order. FIG. 4A illustrates scanning of the frequency-first order according to one embodiment of the disclosure.

Referring to FIG. 4A, the data points in different data blocks are transformed through the frequency transformation at reference 492. Then the resulting frequency coefficients from the frequency transformation is scanned at slice scanning 494, which is done in a frequency-first order. In one embodiment, in the frequency-first order, the frequency coefficients are ordered with frequency coefficients at the same position of each data block of a slice being grouped together, and for the frequency coefficient at the same position, the one of the block with lower block sequence order is scanned earlier.

As illustrated at reference 494, the frequency coefficients of a whole slice in one channel (say slice 1 luma channel) are ordered in a matrix. The matrix has a width equals to the number of data blocks in the slice, and depth equals to the number of data points in a data block. The frequency coefficients are ordered based on the scanning method. For example, the frequency coefficients of the DC component (the lowest frequency) in all the data blocks in the slice are ordered in the raw 0, and the frequency coefficient for Block 0 DC component is the first one to be scanned, followed by the DC component for Block 1, and the row 0 ends at the DC component for Block N−1, where N is the number of total data blocks in the slice. The end of row 0 is followed by row 1 in the frequency-first scanning order, where row 1 contains the frequency coefficients for next lowest frequencies (higher than the DC component but lower than all other frequencies) of all the data blocks. The row 1 is ordered starting with that next lowest frequency coefficient for Block 0, followed by the one for Block 1, and so on.

Thus, the frequency coefficients are ordered to be scanned with the ones positioned corresponding to data point 0 (the DC components of the frequency coefficients in the frequency domain), followed by the ones positioned corresponding to the next lowest frequency, until ends at the highest frequency at M−1, where M is the total number of data points in a data block (the frequency coefficients are ordered to correspond to the increasingly higher frequencies). Since the scan order starts with the DC component of all data blocks and following the data point order to higher frequencies, the scan order is referred to as a frequency-first scanning. It is to be noted that since the frequency-first scanning groups scans the frequency coefficients at a first same frequency of all data blocks in a slice first, and them move to the frequency coefficients at a second, higher frequency of all data blocks in the slice, the frequency coefficients of all the blocks in the slice are scanned prior to the operations at the next step such as quantization.

Figure 4B:
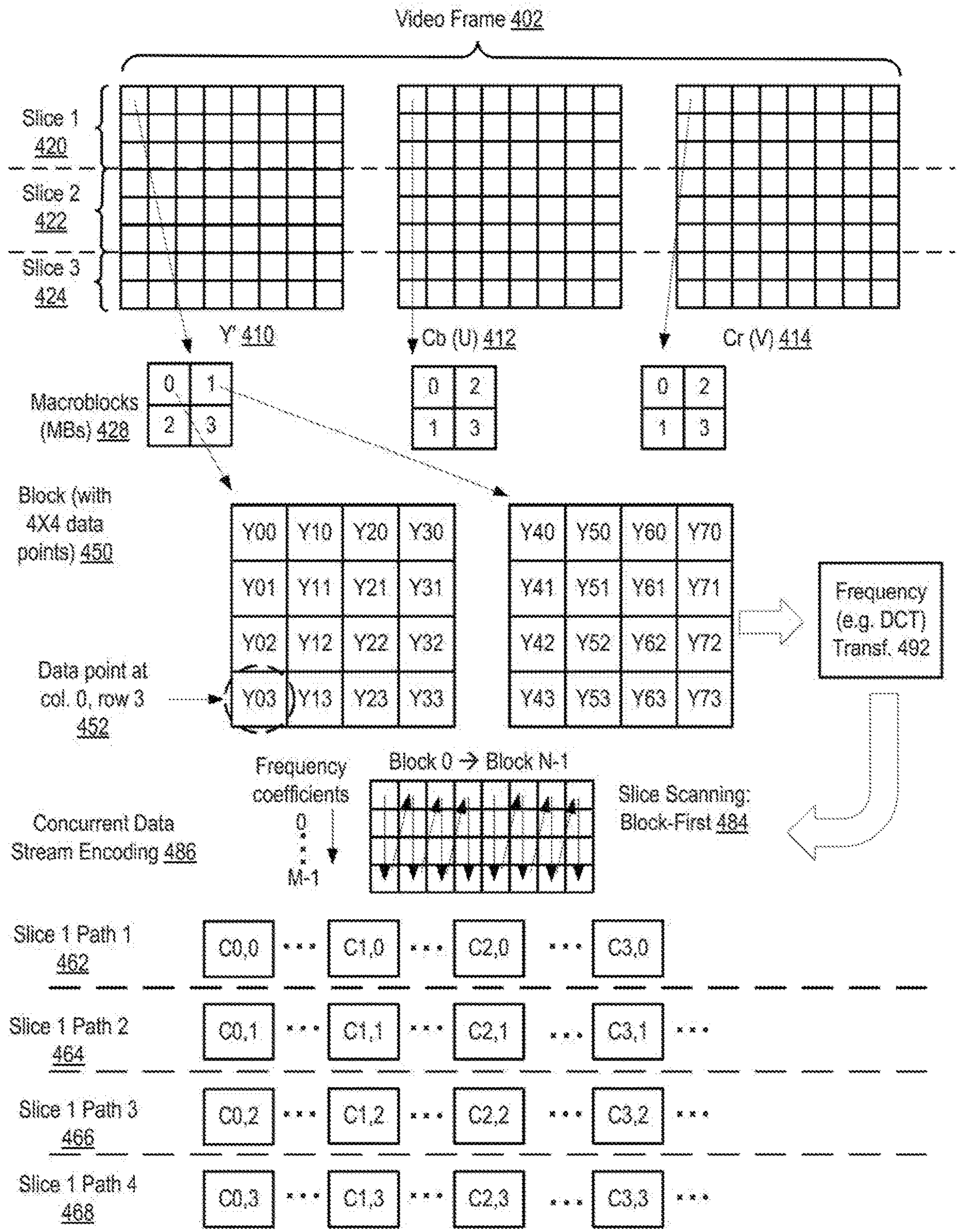
FIG. 4B illustrates data blocks being processed through encoding according to another embodiment of the disclosure.

In alternative, a slice may be scanned in a block-first order. FIG. 4B illustrates data blocks being processed through encoding according to another embodiment of the disclosure. FIG. 4B is similar to FIG. 4A, and the same references indicate elements or components having the same or similar functionalities.

FIG. 4B illustrates a block-first order scanning according to one embodiment of the disclosure. As discussed earlier, at reference 492, the data points in different data blocks are transformed through the frequency transformation. Then the resulting frequency coefficients from the frequency transformation is scanned at slice scanning 484, which is done in a block-first order. In one embodiment, in the block-first order, the frequency coefficients are ordered with frequency coefficients of one data block of a slice are grouped together, where the frequency coefficients of the data block are scanned from lower frequencies to higher ones; and between data blocks, the frequency coefficient are scanned in the order of data block sequence order (the data block sequence order is discussed herein above in relation to the macroblock 428).

At reference 484, the frequency coefficients of Block 0 of a slice are in the highest scanning order in the block-first slice scanning, and the last block of the slice, Block N−1 are in the lowest scanning order in the block-first slice scanning. Within a block, the lower frequencies are scanned first, followed by the higher frequencies. For example, within Block 0, the DC component (the lowest frequency) is scanned first, followed by the second lowest frequency, whose position may correspond to Data point 1 of Block 0, followed by the third lowest frequency, whose position may correspond to Data point 2 of Block 0, and so on. That is, all the frequency coefficients within Block 0 are scanned first, followed by the frequency coefficients within Block 1, until all the frequency coefficients within the slice are scanned. In the block-first slice scanning, after each data block finishes DCT operation and generates the frequency coefficients, the frequency coefficients of that data block, without waiting for data from processing the subsequent data blocks, may be provided to the operations at the next step such as quantization. Thus, while in the frequency-first slice scanning all the frequency coefficients in a slice are scanned prior to the next operation on any of the frequency coefficients, in the block-first slice scanning the frequency coefficients in one block may be scanned and then provided to the next step.

After the frequency-first or block-first slice scanning, the frequency coefficients may be provided to quantization. Referring back to FIG. 3, at task box 3, the quantizer 204 quantizes the frequency coefficients of a slice, using either uniform, scalar quantization with a step-size that may vary on a frame-by-frame basis or other basis. Alternatively, the quantizer 204 may apply another type of quantization to the frequency coefficients, e.g., a non-uniform, vector, or non-adaptive quantization. Quantization is a lossy operation, and information lost during quantization cannot be recovered at the decoder.

The quantization may happen prior to or after the slice scanning, depending on implementation. In one embodiment, the quantization rate of quantizer 204 matches the transforming rate of the frequency transformer 202. For example, when the frequency transformer 202 processes 8 data points every two clock cycles as indicated in a previous example, where the frequency transforming rate is equivalent to 4 data points per clock cycle, the quantizer 204 may quantize 4 data points per clock cycle, thus the processing rate between the frequency transformer 202 and quantizer 204 are matched.

Then at task box 4, the slice encoder 206 encodes the quantized frequency coefficients in a number of data streams concurrently. The slice encoder 206 compresses the output of the quantizer 204 such as frequency coefficients as well as coding information such as quantization step size and motion information. In one embodiment, the slice encoder 206 uses entropy encoding, which may combine a number of consecutive zero valued quantized coefficients with the value of the next nonzero quantized coefficient into a single symbol, and also has special ways of indicating when all of the remaining quantized coefficient values are equal to zero. The entropy coding method may use variable length coding tables. The entropy encoding may use at least one of Huffman coding, arithmetic coding, or static coding such as universal coding or Golomb coding (e.g., exponential-Golomb coding or just Exp-Golomb coding and Rice coding).

Figure 4C:
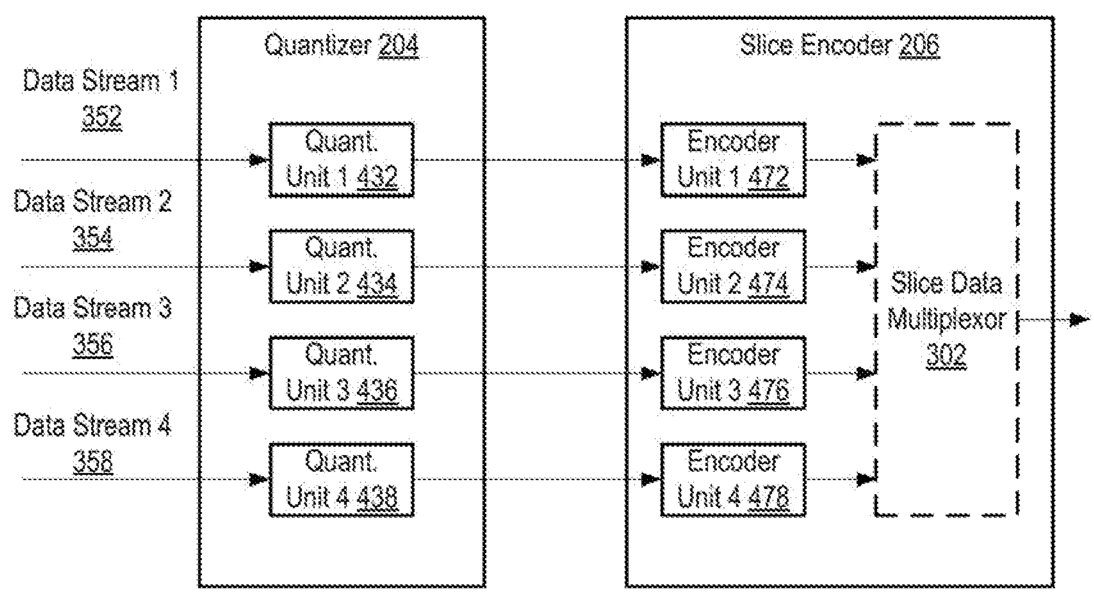
FIG. 4C illustrates concurrent encoding matching quantization according to one embodiment of the disclosure.

In one embodiment, the encoding rate of the slice encoder 206 matches the quantization rate of quantizer 204. For example, when the quantizer 204 quantizes 4 data points per clock cycle, the slice encoder 206 encodes the 4 data points per clock cycle. The result is that 4 concurrent data streams are encoded. FIG. 4C illustrates concurrent encoding matching quantization according to one embodiment of the disclosure. The data streams 352-358 arrive at the quantizer 204 (e.g., directly after the frequency transformer 202 or after scanning as discussed herein above), and the frequency coefficients are quantized at quantization units 1-4 at references 432-438 in one embodiment. The concurrently quantized frequency coefficients are then provided to the slice encoder 206 (through a post quantization scanning in some embodiments), which contains encoder units 1-4 at references 472-478. Once the encoding is completed, the data in the number of data streams are multiplexed together through a slice data multiplexor 302. While the slice data multiplexor 302 is illustrated within the slice encoder 206, the slice data multiplexor may be implemented outside of the slice encoder 206. For example, the slice data multiplexor 302 may be implemented in a circuit that multiplexes the concurrently encoded data streams after the data streams exits the slice encoder 206 (e.g., the multiplexor may be implemented within the BSMAU 208) in one embodiment.

One feature of the slice encoder 206 is that it encodes incoming data of a slice concurrently (thus it may also be referred to as a "parallel" slice encoder). That is, the concurrent encoding is performed within a slice, and the intra-slice concurrent encoding provides better encoding efficiency. In one embodiment, the number of concurrent data streams at the slice encoder 206 matches the concurrency of the transforming rate of the frequency transformer 202 and/or quantization rate of the quantizer 204. Thus, when the frequency transformer 202 processes 8 data points every two clock cycles as indicated in the previous example, where the frequency transforming rate is equivalent to 4 data point per clock cycle, the number of concurrent data streams at the slice encoder 206 is 4.

FIG. 4A illustrate the intra-slice concurrent encoding according to one embodiment of the disclosure. As discussed herein above, the frequency coefficients within a slice are scanned frequency-first at reference 494, and the scanning may happen prior to or after the quantization. The quantized frequency coefficients are then encoded concurrently. Following the previous example, the number of the concurrent data streams is 4. Similarly, when the frequency transformer 202 processes 4 data points per clock cycle (same as the rate at 8 data points per two clock cycles), the number of the concurrent data steams is still 4. The slice encoder 206 performs concurrent data stream encoding for a slice at reference 496. Each of the concurrent data streams is encoded in a path, thus for slice 1, the encoding is performed through paths 1-4 at reference 442-448 concurrently.

At each clock cycle, the slice encoder 206 takes 4 quantized frequency coefficients sequentially from the results of the frequency-first slice scanning of slice 1 at reference 496. As illustrated, Cx,y indicates a frequency coefficient corresponds to data block x at frequency point y. Thus, the first 4 frequency coefficients to be encoded according to the frequency-first scanning order are C0,0 C1,0, C2,0, and C3,0, which are all the DC components (zero frequency) of frequency coefficients corresponding to Blocks 0, 1, 2, and 3 of the slice. The first 4 frequency coefficients are encoded concurrently at the paths 1-4, followed by the next 4 frequency coefficients, which are the next 4 DC components of frequency coefficients corresponding to Blocks 4-7 of the slice. After the DC components of all blocks are encoded, the slice encoder 206 encodes the next lowest frequency, the first 4 of which are C0,1, C1,1, C2,1, and C3, 1. The process continues until all the frequency coefficients of the slice are encoded concurrently.

While FIG. 4A illustrates the intra-slice concurrent encoding for the first-first slice scanning, FIG. 4B illustrates another intra-slice concurrent encoding process. As discussed herein above, the frequency coefficients within a slice are scanned block-first at reference 484, and the scanning may happen prior to or after the quantization. The quantized frequency coefficients are then encoded concurrently. Following the previous example, the number of the concurrent data streams is 4.

Referring to FIG. 4B, at each clock cycle, the slice encoder 206 takes 4 frequency coefficients sequentially from the results of the block-first slice scanning of slice 1 at reference 486. Thus, the first 4 frequency coefficients to be encoded according to the block-first scanning order are C0,0 C0,1, C0,2, and C0,3, which are the first 4 frequency coefficients of Block 0. The first 4 frequency coefficients are encoded concurrently at the paths 1-4 (illustrated at references 462-468), followed by the next 4 frequency coefficients, which are the next 4 frequency coefficients of Block 0. After all the frequency coefficients of Block 0 are encoded, the slice encoder 206 encodes Block 1, which has the first 4 frequency coefficients being C1,0, C1,1, C1,2, and C1,3. The process continues until all the frequency coefficients of the slice are encoded concurrently.

Once the data in a slice is encoded through the encoding of the concurrent data streams, it is then combined into a single data stream. The combination may be performed by a multiplexor. In one embodiment, the multiplexor is within the slice encoder 206 such as the a slice data multiplexor 302. The encoding of the concurrent data streams may result in different lengths of encoded data. For example, for slice 1, the lengths of encoded data in paths 1-4 may be different from each other, and a variety of approaches may be implemented to align the encoded data so that they can be combined properly as a single data stream. For example, bit shifting and inserting dummy bits may be implemented in one or more of the paths.

The rate of the encoding is coordinated with the rate of quantization in one embodiment of the disclosure. Referring back to FIG. 3, the rate controller 205 is configured to control the quantization based on at least the information from the slice encoder 206. The information from the slice encoder 206 may include the length of the encoded data for one slice and/or the clock cycles taken to encode of the slice. Additionally, information from the ISP and registers of the video encoding circuits 350 may also control the quantization at quantizer 204. The rate controller 205 may control the step-size (often being referred to using the symbol Q) of quantization. In one embodiment, the control of the step-size Q is determined through a quantization parameter (QP) when the codec complies with the H.264 protocol. In one embodiment, the rate control uses the information from encoding of the current slice or several slices that have been encoded to control the step-size of the subsequent slices.

Embodiments of the disclosure provide encoding efficiency with matching concurrency at steps of the encoding process. The encoding operating parameters 320 illustrate one example of such matching concurrency of the video encoding circuits 350. As illustrated, the video encoding circuits 350 may operate at frequency 400 MHz (clock of 2.5 nanoseconds per cycle); the frequency transformer 202 operates on 8 data points every two clock cycles; the quantizer 204 operates on 4 data points every clock cycle; and the slice encoder operates on 4 data points every clock cycles through the concurrent data streams).

The encoding operating parameters 320 include a common operating clock for all the video encoding circuits. However, the matching concurrency of the video encoding circuits does not depend on all the video encoding circuits operating on the same operating clock. For example, the frequency transformer 202 may operate at twice of the quantizer 204, thus instead of 8 data points every two clock cycles of the 400 MHz clock, it operates at 800 MHz clock and processes 8 data points every one clock cycle of the 400 MHz clock on which the quantizer 204 operates. In that case, the quantizer 204 needs to realign to operate on 8 data points every clock cycle of 400 MHz clock, and the slice encoder may split the data streams into 8 paths, each for the 8 data points taken at a clock cycle of the 400 MHz.

The matching concurrency of operating depends on the frequencies of operating clock at different circuits and the clock cycles taken to perform the operations in the video encoding circuits. In the illustrated encoding operating parameters 320, because the frequency transformer takes two clock cycles to process a group of data points, it takes twice amount of data points from the data stream at one time in comparison to the later stages. The data point consumption differs when the frequency transformer process cycle is different.

Figure 5:
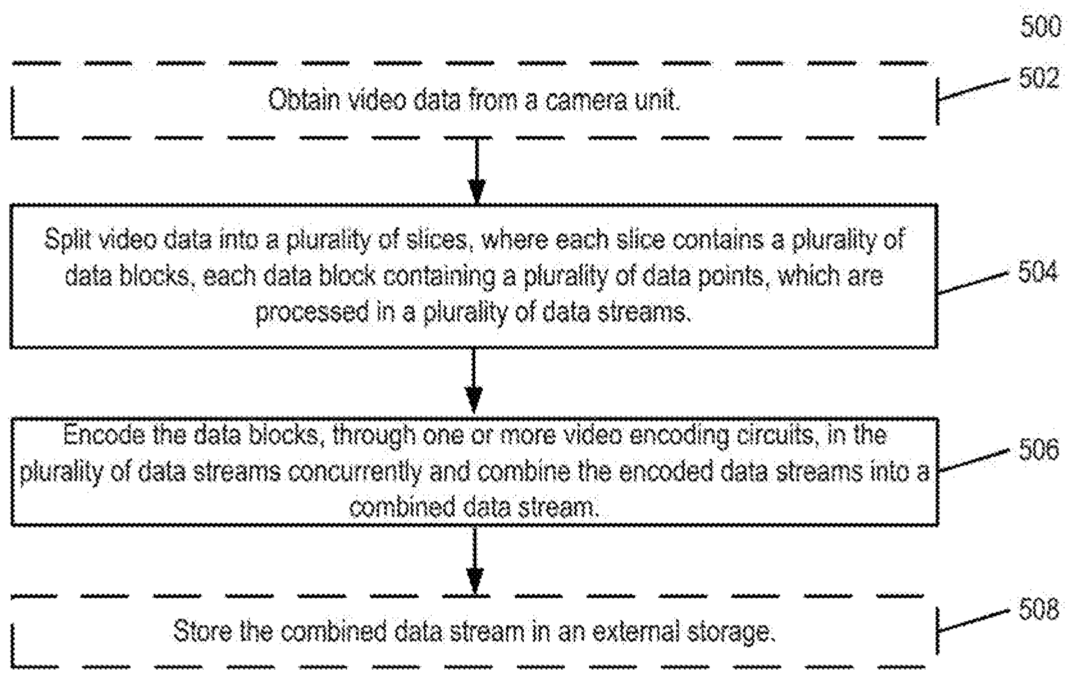
FIG. 5 is a flow diagram illustrating the intra-slice encoding according to one embodiment of the disclosure.

FIG. 5 is a flow diagram illustrating the intra-slice encoding according to one embodiment of the disclosure. The method 500 may be implemented in an electronic device such as the electronic device 150.

At reference 502, the electronic device optionally obtains video data from a camera unit such as the camera 104. The camera unit, within or coupled to the electronic device, generates video data. In one embodiment, the camera unit contains video/image compression components that perform an initial video/image compression on the generated video data. For example, the compression components of the camera unit may remove inter-frame redundancy through encoding.

At reference 504, the electronic device splits the video data into a plurality of slices. Each slice contains a plurality of data blocks, and each data block contains a plurality of data points, which are processed in a plurality of data streams. In one embodiment, the plurality of data blocks forms macroblocks, where one macroblock includes one or more data blocks from a luminance (Y) channel and two chrominance (Cr and Cb) channels. In one embodiment, the operations at reference 504 are performed by a slice splitter, which may be implemented as one or more of circuits or software/firmware modules.

At reference 506, the electronic device encodes the data blocks in the plurality of data streams concurrently and combines the encoded data streams into a combined data stream. The encoding is performed using one or more video encoding circuits. In one embodiment, the combination of the encoded data streams is performed outside of the one or more video encoding circuits.

Then at reference 508, optionally the electronic device stores the combined data stream in an external storage such as the external storage 210 discussed herein above. In one embodiment, the operations within references 504 and 506 are performed by a video encoder.

After the operations of method 500, the combined data stream is then transmitted from the external storage to a decoder such as the video decoder 112, where the combined data stream may be decoded. The decoded data stream is then available for viewing or further process at an affiliated device such as the affiliated device 152.

In one embodiment, the video data from the camera unit may be provided to a plurality of video encoders, and each a portion of the video data. For example, when the camera unit provides video data for 8K UHD resolution at 30 frame per second (fps), one video encoder may encode one half of the video data (e.g., one video encoder encodes the left portions the video frames while the other encodes the right portions). Such encoding results in two combined data streams. The two combined data streams are then integrated in the external storage outside of the two video encoders, and the resulting data stream is transmitted to the decoder.

Figure 6:
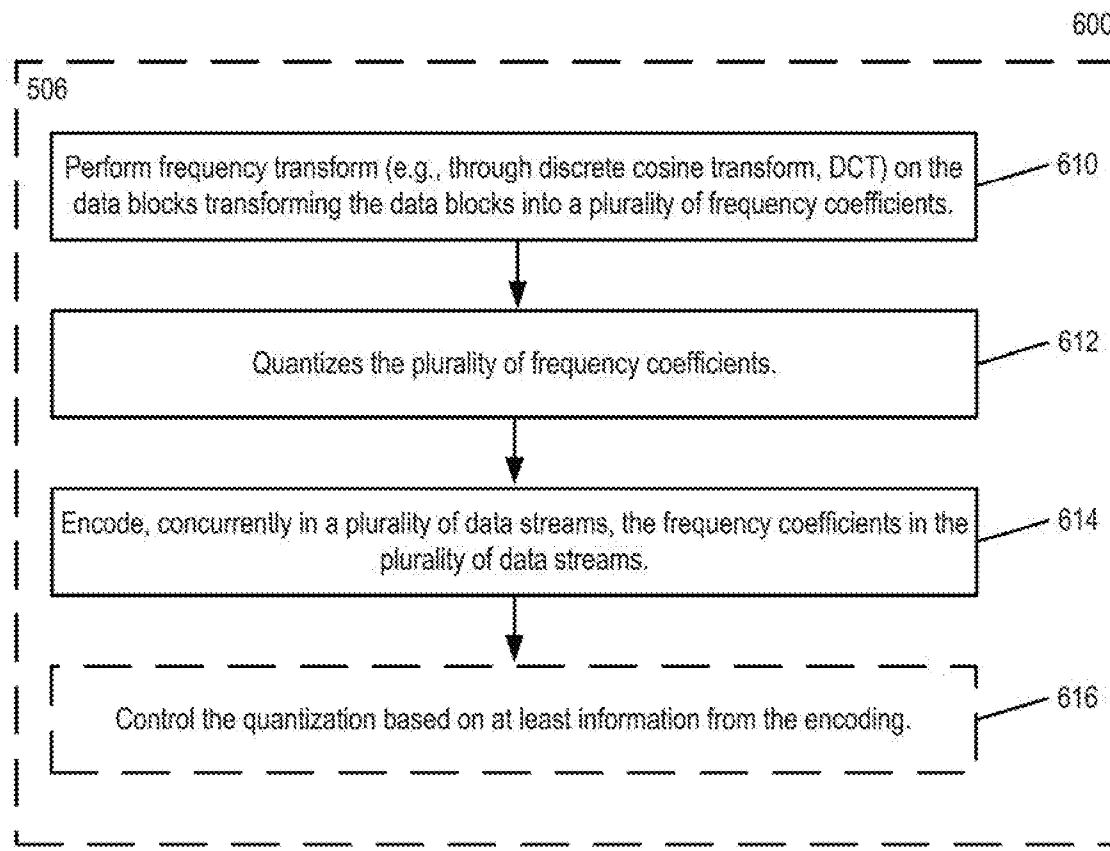
FIG. 6 is a flow diagram illustrating encoding operations in more details according to one embodiment of the disclosure.

FIG. 6 is a flow diagram illustrating encoding operations in more details according to one embodiment of the disclosure. The method 600 may be implemented in an electronic device such as the electronic device 150. In one embodiment, the method 600 is an implementation of reference 506.

At reference 610, the electronic device performs frequency transformation on the data blocks transforming the data blocks into a plurality of frequency coefficients. In one embodiment, the frequency transformation is performed through DCT.

At reference 612, the electronic device quantizes the plurality of frequency coefficients. As discussed herein above, the plurality of frequency coefficients transformed from the plurality of data blocks within a slice may be scanned in a frequency-first order or a block-first order, and the scanning may be performed prior to or after the quantization.

At reference 614, the electronic device encodes the plurality of frequency coefficients in a plurality of data streams concurrently. In one embodiment, the combined encoding rate to concurrently encode the plurality of data streams matches a combined rate of the frequency transform of the data blocks as discussed herein above.

At reference 616, the electronic device optionally controls the quantization based on at least information from the encoding. In one embodiment, the information from the encoding include the length of the encoded data for one slice and/or the clock cycles taken to encode of the slice. Additionally, information from an ISP and registers of the video encoding circuits performing the encoding may also control the quantization.

It is to be noted while in one embodiment, the data blocks are frequency transformed and quantized prior to being encoded, in an alternative embodiment, the data blocks may be encoded directly without one or more of the frequency transformation and quantization.

Figure 7:
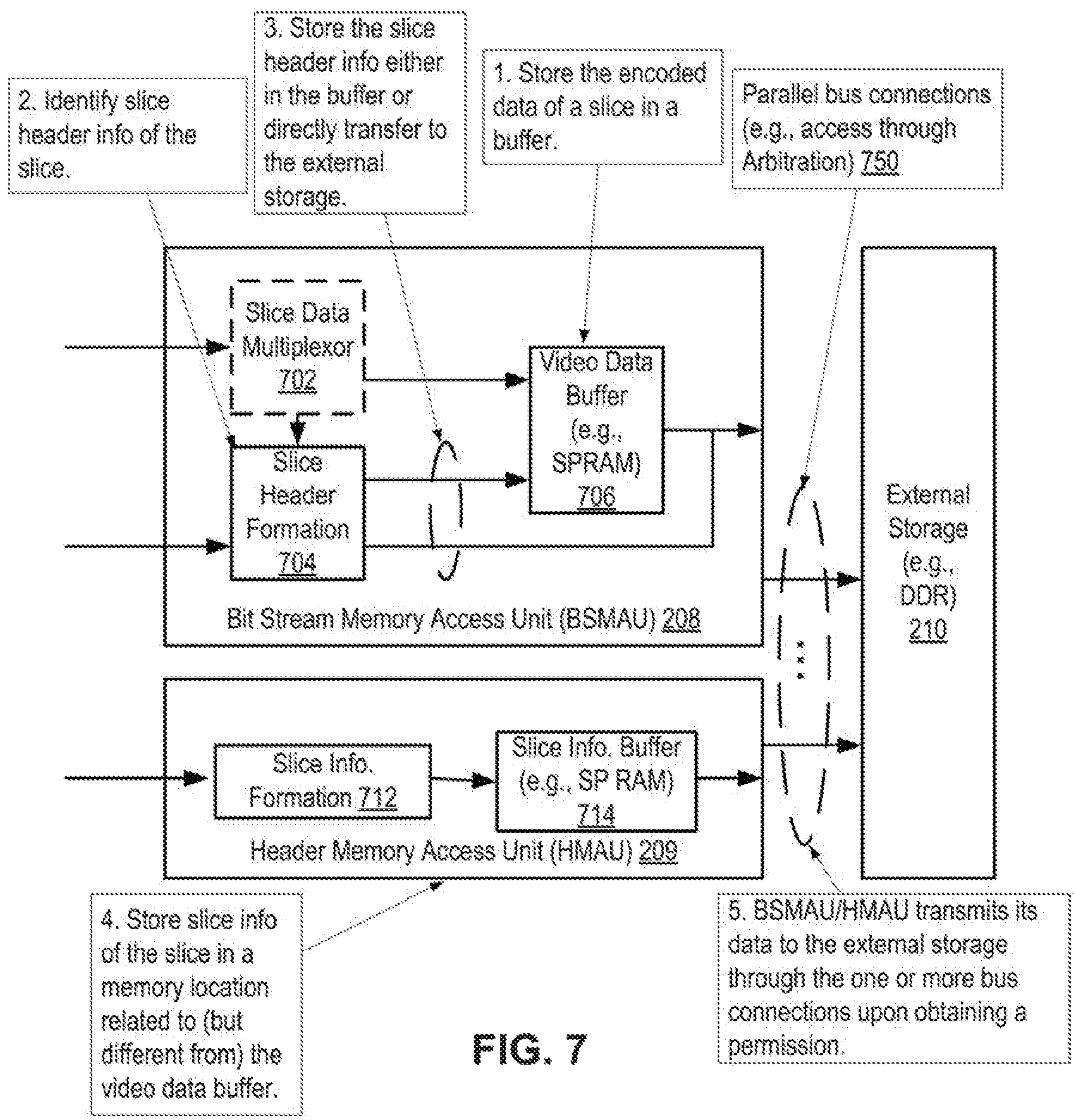
FIG. 7 illustrates a post-encoding process according to one embodiment of the disclosure.

Embodiments of the disclosure encode a plurality of data blocks within a slice concurrently in a plurality of data streams. The encoded data may be stored within the video encoder that performs the encoding first prior to being transmitted to an external storage. FIG. 7 illustrates a post-encoding process according to one embodiment of the disclosure. While in one embodiment, the operations in FIG. 7 are a continuation of operations in FIG. 3, where the video data are encoded through the specified process, in an alternative embodiment, the operations in FIG. 7 are independent from the operations in FIG. 3 and they are to process encoded data through a different intra-slice encoding process, using the same or different elements or components as illustrated in FIG. 3.

FIG. 7 contains elements or components with the same reference numbers, which indicate the elements or components having the same or similar functionalities. Task boxes 1-5 illustrate the order in which operations are performed according to one embodiment of the disclosure. FIG. 7 illustrates a portion of an electronic device performing video encoding.

Referring to FIG. 7, the BSMAU 208 includes a slice header formation module 704 (slice header formation subcircuit), video data buffer 706, and optional slice data multiplexor 702. The slice data multiplexor 702 multiplexes concurrently encoded multiple data streams of slices, if the multiplexing is not done in the earlier stage of the video encoder.

At task box 1, the electronic device stores the encoded data of a slice in the video data buffer 706. The video data buffer is a single port RAM in one embodiment. While receiving the encoded data in the BSMAU 208, at task box 2, the slice header formation module identifies the slice header information of the slice. The slice header information may be obtained directly from the encoding process and/or from the process of multiplexing the concurrently encoded multiple data streams of a slice.

In one embodiment, the slice header information of the slice includes at least one of a slice header size, a size of luma data in the slice, or a size of chroma data in the slice. Additionally or alternatively, the slice header information of the slice includes one or more quantization parameters such as a scale factor of the slice for quantization in one embodiment. FIG. 8 illustrates composition of slice header information according to one embodiment of the disclosure. As illustrated, the slice header information parameters 802 include values 804, which are the following: the slice header size in bytes 810 has a value of 2 indicating 2 bytes, the scale factor 812 has a value of 4, the size of luma data in the slice in bytes 814 has a value of 186 indicating 186 bytes, and the size of chroma data in the slice in bytes 816 has a value of 62 indicating 62 bytes. The slice header information may have more, less, or different parameters as illustrated in FIG. 8 in various embodiments of the disclosure.

At task box 3, the electronic device stores the slice header information either in the video data buffer 706 together with the encoded data of the slice or directly transmit it to the external storage 210. The decision of either to store the slice header information in the buffer or directly transmit to the external storage is based on at least partially on the combined length of the slice header information and the encoded data of the slice. If the storage space within the buffer is insufficient to accommodate both the slice header information and the encoded data of the slice, the slice header information is transmitted to the external storage directly, otherwise the slice header information is stored along with the encoded data of the slice.

Storing the slice header information along with the encoded data of the slice is advantageous in that the slice header information then will be transmitted along with the encoded data of the slice (the slice header information may be transmitted ahead of the encoded data of the slice), and they can be written to the external storage in one or more consecutive clock cycles, thus speed up the processing of the slice.

Once the encoded data of the slice is stored in the buffer, its slice information is known. Thus, at task box 4, the slice information of the slice is stored in a memory location at HMAU 209, which is related to but different from the video data buffer. The slice information includes the slice length after encoding, thus the slice information is not available until the slice encoding completes. It is advantageous to store the slice information in a memory location different from the one storing the encoded data so that the encoded data of a slice can be continuously written to the buffer without concerning about the yet to be determined slice length. Once the slice length is determined, it is written to the HMAU 209. The slice information is written through a slice information formation module 712. The slice information formation module 712 writes slice information to a slice information buffer 714, which may be implemented using a single port RAM (SPRAM). In one embodiment, the slice information includes a slice index table.

FIG. 9 illustrates a slice index table according to one embodiment of the disclosure. Within the slice index table, each slice is indexed with a numeric number, and the slice index table indicates the slice lengths of all the slices in a frame such as the video frame 402. The slice index table includes slice index 902 and slice length 904. Each entry in the slice index table indicates a slice length of a slice. In one embodiment, the slice length is indicated using two bytes. In this example, slice 1 at 912 has the slice length of 486 bytes, slice 2 at 914 has the slice length of 359 bytes, slice 3 at 916 has the slice length of 378 bytes, and slice 4 at 918 has the slice length of 186 bytes.

The slice index table is filled in as slices within a frame are encoded. The value of each entry for a slice is filled in once the corresponding slice completes its encoding. Thus, the slice index table is not completed until all the slices within the frame are encoded. In one embodiment, each entry of the slice index table includes additional information. For example, the entry may include which video frame that the slice is sourced from. It is noted that slice information and slice header information are distinctive from each other in that slice information is the information of the slice in relationship with a frame to which the slice belongs (e.g., slice information stored in the slice index table to provide a summary of lengths of slices within a frame as illustrated in FIG. 9), while the slice header information is the information regarding intra-slice encoding (e.g., information illustrated in FIG. 8).

Referring back to FIG. 7, at task box 5, either the B SMAU 208 or the HMAU 209 transmits its data to the external storage 210 through the one or more bus connections upon obtaining a permission. The one or more bus connections at reference 750 may be access through arbitration, the winner of which obtains the permission. The one or more bus connections may be implemented as parallel bus lines that concurrently transmit multiple bits (e.g., 128 bits) from either the BSMAU 208 or the HMAU 209. For example, the bus lines may be an advanced extensible interface (AXI) in the ARM architecture. The parallel bus lines transmission is sometimes referred to as burst, and during a burst, data may be transmitted to the external storage based on a single address.

The BSMAU 208 or the HMAU 209 may issue a request when it is ready to write to the external storage 210. An arbitrator of the bus connections determines if the bus connections are idle, and if the bus connections are idle, the BSMAU 208 or the HMAU 209 takes the ownership of the bus connections (e.g., through setting up a lock), and transmits its data to the external storage 210. Once the transmission completes, the MAU releases the bus connections, and others may use the bus connections.

In one embodiment, the BSMAU 208 requests and then transmits the stored data in the buffer to the external storage when a predetermined condition is met. The predetermined condition may be that the stored data in the buffer has reached a threshold (e.g., 85% full) and/or the slice header information of a slice is stored in the buffer.

Figure 10:
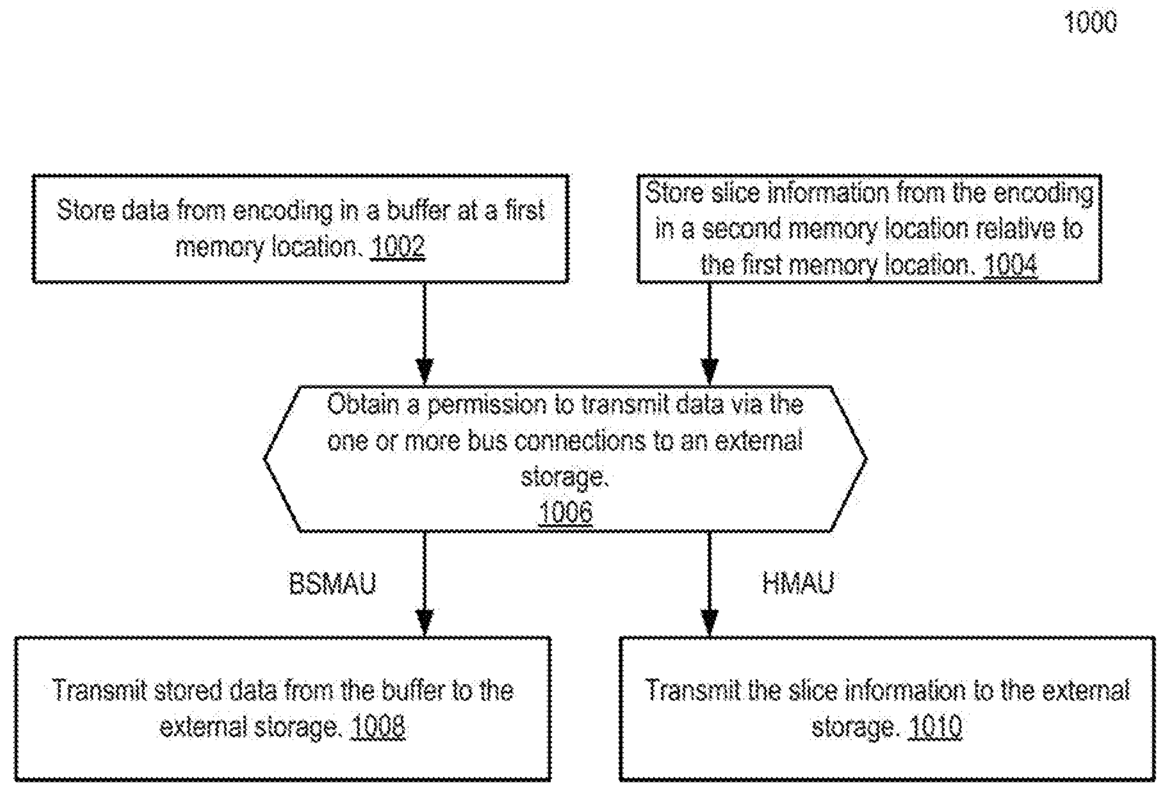
FIG. 10 is a flow diagram illustrating transmitting data to an external storage according to one embodiment of the disclosure.

FIG. 10 is a flow diagram illustrating transmitting data to an external storage according to one embodiment of the disclosure. Method 1000 may be implemented in an electronic device such as the electronic device 150.

Method 1000 starts at reference 1002, where the electronic device stores data from encoding in a buffer at the first memory location. The buffer may be the video data buffer 706 as discussed herein above. The data from encoding may include both the data encoded from the combined data stream and slice header information of a slice as discussed herein.

At reference 1004, the electronic device may store slice information (such as a slice index table) from the encoding in a second memory location relative to the first memory location. The two memory locations are different but related in that both store information related to intra-slice encoding of slices of a video stream, and the electronic device may identify the two memory locations as related.

At reference 1006, it is determined a permission to transmit data via the one or more bus connections to an external storage such as external storage 210. Either the BSMAU 208 or the HMAU 209 may request the permission to transmit, and the request may be triggered after a predetermined condition is met at the buffer or the second memory location. For example, for the BSMAU 208, the predetermined condition may be that the stored data in the buffer has reached a threshold (e.g., 85% full) and/or the slice header information of a slice is stored in the buffer; for the HMAU 209, the predetermined condition may be that the slice index table for a frame is complete or the stored data in the second memory location has reached a threshold. The determination may be made by an arbitration module monitoring access request of the one or more bus connections.

When it is determined that the buffer obtains the permission to transmit its data, the flow goes to reference 1008, where the stored data from the buffer is transmitted to the external storage. When it is determined that the second memory location obtains the permission to transmit data, the flow goes to reference 1010, where the slice information is transmitted to the external storage.

Figure 11:
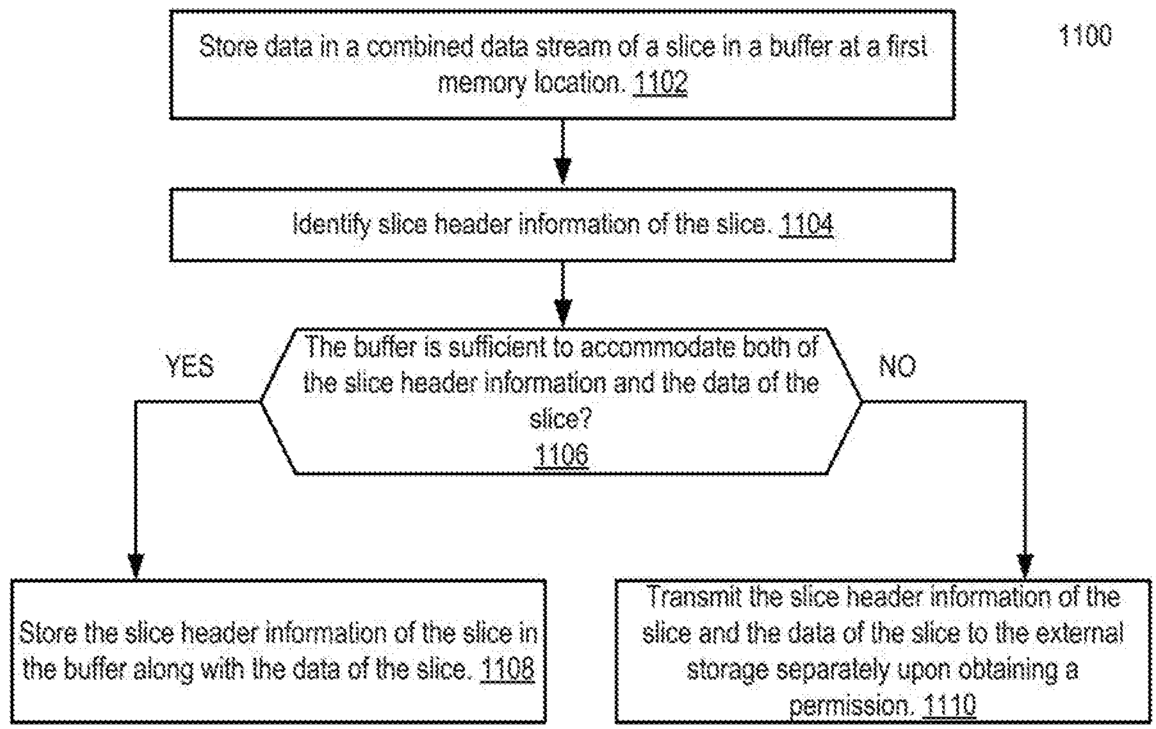
FIG. 11 is a flow diagram illustrating storing data in a video encoding buffer according to one embodiment of the disclosure.

FIG. 11 is a flow diagram illustrating storing data in a video encoding buffer according to one embodiment of the disclosure. Method 1100 may be implemented in an electronic device such as the electronic device 150. The video encoding buffer may be the video encoding buffer 706 as discussed herein above.

At reference 1102, the electronic device stores data in a combined data stream of a slice in a buffer at a first memory location. The combined data stream is a data stream being combined from a plurality of data streams concurrently encoded by a video encoder. The combination may be performed within the video encoder (such as the slice data multiplexor 302), or by a multiplexor at the first memory location such as the slice data multiplexor 702 of the BSMAU 208.

At reference 1104, the electronic device identifies slice header information. The slice header information may be obtained during the encoding of the plurality of data streams (e.g., from the slice encoder 206) and/or during combining the data streams (e.g., from the slice data multiplexor 302 or 702).

At reference 1106, it is determined whether the buffer is sufficient to accommodate a slice's slice header information and the data of the slice in the combined data stream. The determination may be based on the storage capacity of the buffer. When the slice header information and the data of the slice in combination are within the storage capacity (or a certain threshold of the storage capacity) of the buffer, the flow goes to reference 1108, where the slice header information of the slice is stored in the buffer along with the data of the slice. Afterward, when a predetermined condition is met, the data in the buffer is transmitted to the external storage as discussed herein above.

When the slice header information and the data of the slice in combination exceeds the storage capacity (or a certain threshold of the storage capacity) of the buffer thus the buffer is insufficient to accommodate both of the slice header information and the data of the slice, the flow goes to reference 1110, where the slice header information of the slice and the data of the slice are transmitted to the external storage separately upon obtaining a permission.

Transmitting the slice header information along with the encoded data of the slice through the one or more bus connections is advantageous. The one or more bus connections may be implemented as parallel bus lines that concurrently transmit multiple bits. Thus, the slice header information may be transmitted ahead of the encoded data and within one or more consecutive clock cycles thus speed up the processing of the slice. Additionally, the parallel bus line transmission may use burst, where the slice header information and the encoded data may be transmitted during a burst based on a single address.

When the one or more bus connections are implemented as parallel bus lines that concurrently transmit multiple bits, the ideal transmission is that each of the parallel bus lines has data to transmit. When some of the parallel bus lines have no data to transmit, dummy bits/bytes are added for the bus lines to transmit. The dummy bits/bytes may be one of all ones, all zeros, and other predetermined bit/byte patterns. For example, the one or more bus connections includes parallel bus lines for concurrently transmitting 128 bits, and when the data in the buffer (e.g., the video data buffer 706) is insufficient to fulfil the parallel bus lines, dummy bits/bytes are transmitted along with the valid data.

The amount of data in the second memory location is generally less than the ones in the buffer, as the size of slice information is generally smaller (e.g., the slice length takes two bytes in the example of FIG. 9, thus the size of a slice index table is much smaller comparing to the encoded data that can be hundreds or thousands of bytes). In the external storage, a region is generally reserved to store the slice information of a frame. With the parallel bus lines, it is desirable to transmit the slice information during a burst based on the single address point to the region. Thus, a number of dummy bits/bytes may be added for such burst transmission.

Figure 12:
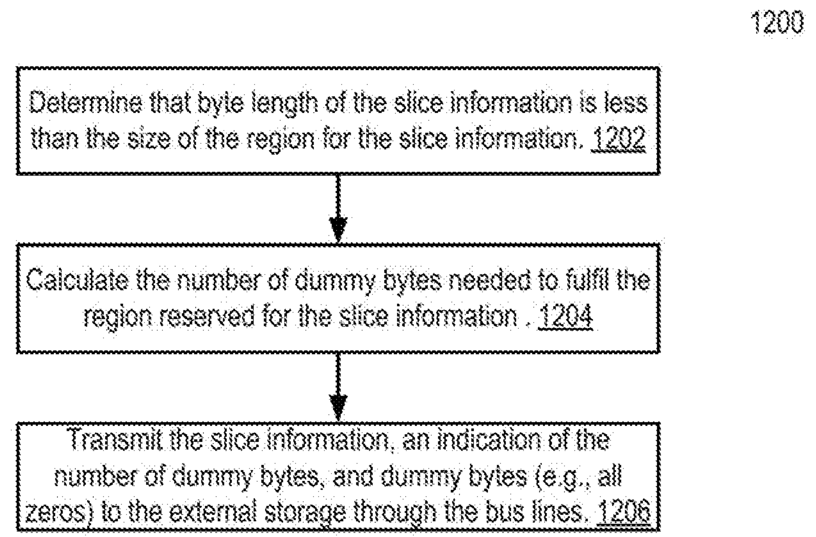
FIG. 12 is a flow diagram illustrating dummy byte insertion in transmission of slice information to an external storage according to one embodiment of the disclosure.

FIG. 12 is a flow diagram illustrating dummy byte insertion in transmission of slice information to an external storage according to one embodiment of the disclosure. Method 1200 may be implemented in an electronic device such as the electronic device 150.

At reference 1202, the electronic device determines that the byte length of the slice information of a frame is less than the size of a region reserved for the slice information of the slice. The region is one within an external storage such as the external storage 210.

At reference 1204, the electronic device calculates the number of dummy bytes needed to fulfill the range reserved for the slice information. Then at reference 1206, the electronic device transmits the slice information, an indication of the number of dummy bytes, and dummy bytes to the external storage through one or more bus connections.

The number of dummy bytes may be zero, or an integer number that within the byte width of the one or more bus connections in one embodiment. For example, assuming the parallel bus line is 128 bites thus 16 bytes, the number of dummy bytes may be a number between 0 and 14, so that one byte may be used to indicate the number of the dummy bytes, and the rest of the bytes may be dummy bytes.

In an alternative embodiment, the number of dummy bytes may be between zero and an integer number that within the byte size of the region. Thus multiple clock cycles may be used to transmit dummy bytes in such embodiment. While dummy bytes are discussed for insertion, in an alternative embodiment, dummy bits are used as the unit to calculate the number of dummy information to insert and to transmit to the external storage.

Figure 13:
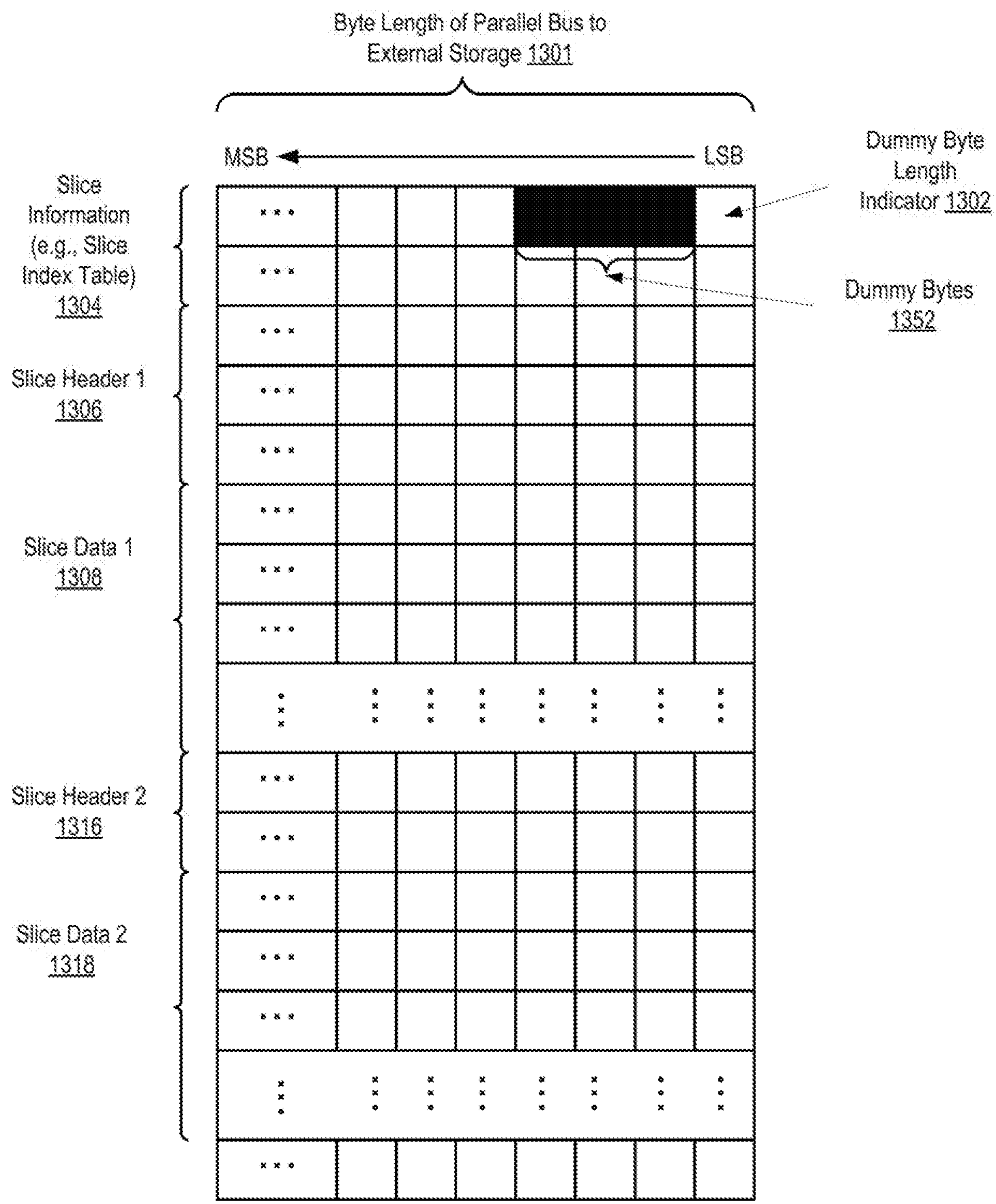
FIG. 13 illustrates memory allocation of an external storage according to one embodiment of the disclosure.

FIG. 13 illustrates memory allocation of an external storage according to one embodiment of the disclosure. The external storage may be the external storage 210. The data stored in the memory location is for one video frame. The width of the portion of storage for the video frame is the byte length of the parallel bus to the external storage as illustrated at reference 1301. In an alternative embodiment, different width of the portion of storage may be used.

The data is stored with the most significant bit (MSB) on the left and the least significant bit (LSB) on the right. In this embodiment, the first byte is a dummy byte length indicator 1302 that indicates the length of the dummy bytes. In an alternative embodiment, more bytes may be used to indicate the length of the dummy bytes. Following the dummy byte length indictor is consecutive dummy bytes 1352 as indicated by the dummy length indicator. Following the dummy bytes are the slice information, which includes slice index table.

As illustrated, the portion of storage starts with the region for slice information 1304. The region includes a slice index table of the video frame. The dummy byte length indicator may be read by a video process driver, which then inserts information such as a frame header and/or a picture header of the video frame in the place of the dummy bytes. While less than a row of dummy bytes is illustrated, the dummy byte may take more than one row in region for the slice information.

The region for the slice information is followed by slice header 1 at reference 1306, and slice data 1 at reference 1308, which include header and data of slice 1 of the video frame. The following data of the video frame is then stored in the order of a slice header being followed by a slice data of the same slice until all data of the video frame is stored.

All the data of the video frame stored in the portion of the storage is then transmitted to a decoder. The dummy byte length indicator and the dummy bytes are removed prior to the transmission to the decoder. In one embodiment, all the remaining data of the video frame after encoding are sealed in one or more packets, which are then transmitted through a communication network such as the communication network 190, and then decoded at an electronic device such as the affiliated device 152 by a video decoder such as the video decoder 112 for display (e.g., by the display 114) or further process.

Figure 14:
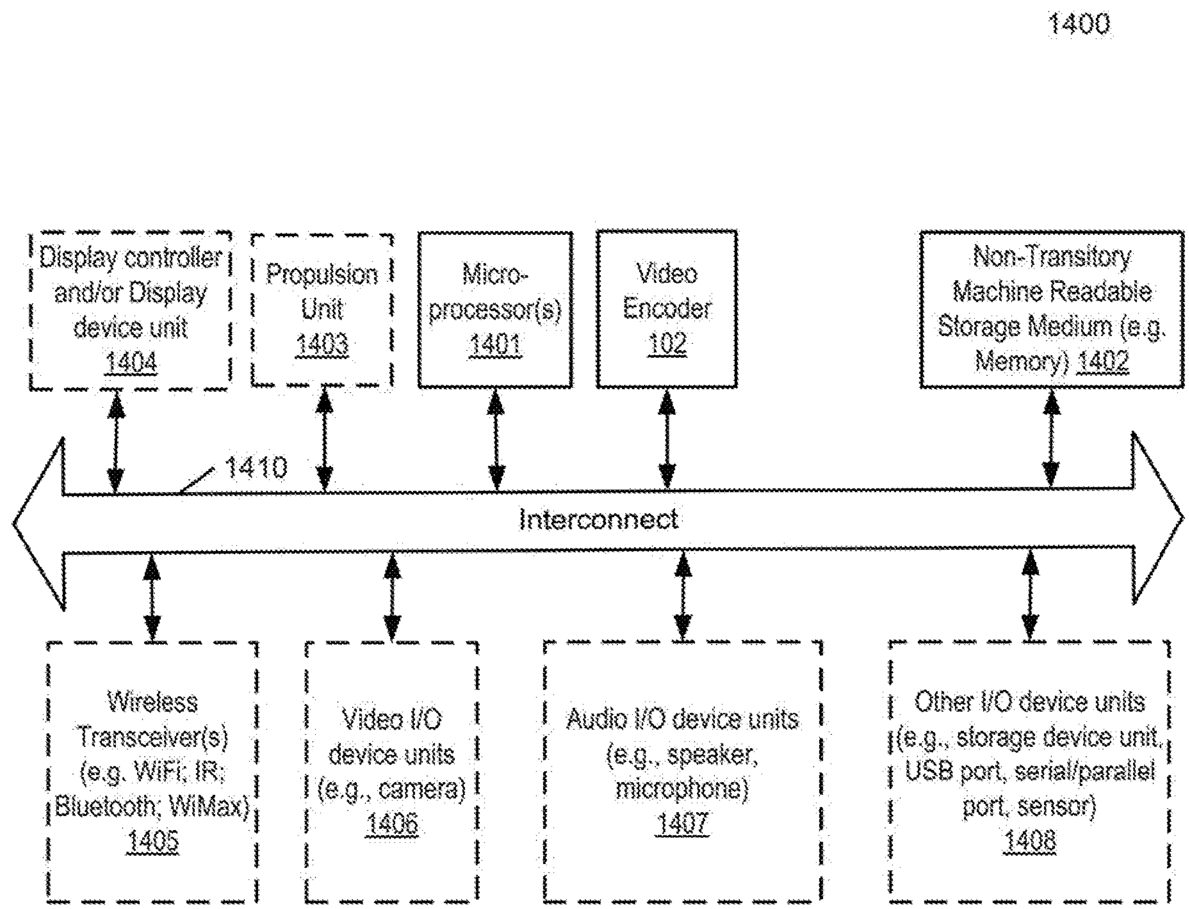
FIG. 14 is an exemplary illustration of an electronic device for encoding video, in accordance with various embodiments of the present disclosure.

FIG. 14 is an exemplary illustration of an electronic device for encoding video, in accordance with various embodiments of the present disclosure. The electronic device 1400 including many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the electronic device 1400 is intended to show a high level view of many components of the computing system. However, it is to be understood that additional components may be present in certain implementations and furthermore, different arrangement of the components shown may occur in other implementations. In one embodiment, the electronic device is a movable object as discussed herein above.

In one embodiment, the electronic device 1400 includes one or more microprocessors 1401, a video encoder 102, and non-transitory machine-readable storage medium 1402, and optional devices 1403-1408 that are interconnected via a bus or an interconnect 1410. The one or more microprocessor 1401 represent one or more general-purpose microprocessors such as a central processing unit (CPU), or processing device. More particularly, the microprocessor 1401 may be a complex instruction set computing (CISC) microprocessor, reduced instruction set computing (RISC) microprocessor, very long instruction word (VLIW) microprocessor, or microprocessor implementing other instruction sets, or microprocessors implementing a combination of instruction sets. Microprocessor 1401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The one or more microprocessor 1401 may communicate with non-transitory machine-readable storage medium 1402 (also called computer-readable storage medium), such as magnetic disks, optical disks, read only memory (ROM), flash memory devices, and phase change memory. The non-transitory machine-readable storage medium 1402 may store information including sequences of instructions, such as computer programs, that are executed by the one or more microprocessors 1401, or any other device units. For example, executable code and/or data of a variety of operating systems, device drivers, firmware (e.g., input output basic system or BIOS), and/or applications can be loaded in the one or more microprocessor 1401 and executed by the one or more microprocessor 1401.

The non-transitory machine-readable storage medium 1402 may store a video process driver, which contains instructions and/or information to perform operations for video encoding such as identifying picture and/or frame headers of video frames in a video stream. Additionally, the non-transitory machine-readable storage medium 1402 may include an external storage such as the external storage 210.

The video encoder 102 of the electronic device 1400 contains instructions and/or information to perform operations for intra-slice video encoding as discussed herein above. The video encoder 102 may be implemented using one or more circuits.

The optional propulsion unit 1403 may include one or more devices or systems operable to generate forces for sustaining controlled movement of the electronic device 1400. The propulsion unit 1403 may share or may each separately include or be operatively connected to a power source, such as a motor (e.g., an electric motor, hydraulic motor, pneumatic motor, etc.), an engine (e.g., an internal combustion engine, a turbine engine, etc.), a battery bank, etc., or combinations thereof. The propulsion unit 1403 may also include one or more rotary components connected to the power source and configured to participate in the generation of forces for sustaining controlled flight. For instance, rotary components may include rotors, propellers, blades, nozzles, etc., which may be driven on or by a shaft, axle, wheel, hydraulic system, pneumatic system, or other component or system configured to transfer power from the power source. The propulsion unit 1403 and/or rotary components may be adjustable with respect to each other and/or with respect to the electronic device 1400. The propulsion unit 1403 may be configured to propel the electronic device 1400 in one or more vertical and horizontal directions and to allow the electronic device 1400 to rotate about one or more axes. That is, the propulsion unit 1403 may be configured to provide lift and/or thrust for creating and maintaining translational and rotational movements of the electronic device 1400.

The electronic device 1400 may optionally further include display control and/or display device unit 1404, wireless transceiver(s) 1405, video I/O device unit(s) 1406, audio I/O device unit(s) 1407, and other I/O device units 1408 as illustrated. The wireless transceiver 1405 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof.

The video I/O device unit 1406 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. The video I/O device unit 1406 may be a 4K or 8K camera/camcorder in one embodiment.

An audio I/O device unit 1407 may include a speaker and/or a microphone to facilitate voice-enabled functions, such as voice recognition, voice replication, digital recording, and/or telephony functions. Other optional devices 1408 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 1408 may further include certain sensors coupled to the interconnect 1410 via a sensor hub (not shown), while other devices such as a thermal sensor, an altitude sensor, an accelerometer, and an ambient light sensor may be controlled by an embedded controller (not shown), dependent upon the specific configuration or design of the electronic device 1400.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. An electronic device comprising:

a slice splitter configured to split video data into a plurality of slices, wherein each slice contains a plurality of data blocks and each data block contains a plurality of data points;

a slice encoder including one or more video encoding circuits, and configured to:

encode the data blocks in a plurality of data streams concurrently to obtain encoded data streams; and combine the encoded data streams into a combined data stream;

wherein the one or more video encoding circuits are configured to operate concurrently with each of the one or more video encoding circuits running on an independent clock cycle;

a bit stream memory access circuit configured to cause the combined data stream to be stored in a buffer at a first memory location; and a header memory access circuit configured to cause slice information from the slice encoder to be stored in a second memory location relative to the first memory location;

wherein:

the bit stream memory access circuit and the header memory access circuit are coupled to an external storage via one or more bus connections;

one of the bit stream memory access circuit and the header memory access circuit is further configured to transmit data to the external storage upon obtaining a permission; and the header memory access circuit is further configured to cause the external storage to be notified of a difference between a byte length of the slice information and a byte length of the one or more bus connections.

2. The electronic device of claim 1, further comprising:

a frequency transformer configured to transform the data blocks into a plurality of frequency coefficients.

3. The electronic device of claim 2, wherein the frequency transformer is configured to perform a discrete cosine transform (DCT) on the data blocks.

4. The electronic device of claim 2, wherein the plurality of frequency coefficients transformed from the plurality of data blocks within one slice are scanned in a frequency-first order or a block-first order.

5. The electronic device of claim 2, further comprising:

a quantizer configured to quantize the plurality of frequency coefficients from the frequency transformer to obtain quantized frequency coefficients; and a rate controller configured to control the quantization by the quantizer based on at least information from the slice encoder.

6. The electronic device of claim 5, wherein the slice encoder is configured to encode the quantized frequency coefficients concurrently in the plurality of data streams.

7. The electronic device of claim 2, wherein a combined encoding rate of the slice encoder in encoding the plurality of data streams concurrently matches a combined transforming rate of the frequency transformer in transforming the data blocks.

8. The electronic device of claim 1, wherein the slice information is contained in a slice index table.

9. The electronic device of claim 1, wherein the bit stream memory access circuit includes a slice header formation sub-circuit configured to identify slice header information of the slices, the slice header information of one slice including at least one of:

a slice header size;

a scale factor;

a size of luma data in the one slice; or a size of chroma data in the one slice.

10. The electronic device of claim 1, wherein the plurality of data blocks form macroblocks, and one macroblock includes one or more data blocks from each of a luminance (Y) channel and two chrominance (Cr and Cb) channels.

11. A method for encoding video data, comprising:

splitting video data into a plurality of slices, wherein each slice contains a plurality of data blocks and each data block contains a plurality of data points;

encoding the data blocks, through one or more video encoding circuits, in a plurality of data streams concurrently to obtain encoded data streams, wherein the one or more video encoding circuits are configured to operate currently with each of the one or more video encoding circuits running on an independent clock cycle;

combining the encoded data streams into a combined data stream;

storing, via a bit stream memory access circuit, the combined data stream in a buffer at a first memory location;

storing, via a header memory access circuit, slice information from the encoding in a second memory location relative to the first memory location, wherein the bit stream memory access circuit and the header memory access circuit are coupled to an external storage via one or more bus connections, and one of the bit stream memory access circuit and the header memory access circuit is configured to transmit data to the external storage upon obtaining a permission; and notifying, via the header memory access circuit, the external storage a difference between a byte length of the slice information and a byte length of the one or more bus connections.

12. The method of claim 11, further comprising:

performing frequency transform on the data blocks to transform the data blocks into a plurality of frequency coefficients.

13. The method of claim 12, wherein the plurality of frequency coefficients transformed from the plurality of data blocks within one slice are scanned in a frequency-first order or a block-first order.

14. The method of claim 12, further comprising:

quantizing the plurality of frequency coefficients under a control based on information from the one or more video encoding circuits.

15. The method of claim 12, wherein a combined encoding rate to encode the plurality of data streams concurrently matches a combined transforming rate of the frequency transform of the data blocks.

16. An unmanned aircraft, comprising:

a propulsion unit configured to effect a movement of the unmanned aircraft;

a camera configured to generate video data;

a slice splitter configured to split the video data into a plurality of slices, wherein each slice contains a plurality of data blocks and each data block contains a plurality of data points;

a slice encoder including one or more video encoding circuits and configured to:

encode the data blocks in a plurality of data streams concurrently to obtain encoded data streams; and combine the encoded data streams into combined data streams;

wherein the one or more video encoding circuits are configured to operate concurrently with each of the one or more video encoding circuits running on an independent clock cycle;

a bit stream memory access circuit configured to cause the combined data stream to be stored in a buffer at a first memory location; and a header memory access circuit configured to cause slice information from the slice encoder to be stored in a second memory location relative to the first memory location;

wherein:

the bit stream memory access circuit and the header memory access circuit are coupled to an external storage via one or more bus connections;

one of the bit stream memory access circuit and the header memory access circuit is further configured to transmit data to the external storage upon obtaining a permission; and the header memory access circuit is further configured to cause the external storage to be notified of a difference between a byte length of the slice information and a byte length of the one or more bus connections.

* * * * *